(12) United States Patent
Ding et al.

(10) Patent No.: US 12,476,994 B2
(45) Date of Patent: Nov. 18, 2025

(54) AUTOMATED CYBERSECURITY VULNERABILITY PRIORITIZATION

(71) Applicant: Accenture Global Solutions Limited, Dublin (IE)

(72) Inventors: Aolin Ding, Piscataway, NJ (US); Hodaya Binyamini, Beer Sheva (IL); Gal Engelberg, Pardes-hana (IL); Louis William DiValentin, Arlington, VA (US); Benjamin Glen McCarty, Washington, DC (US); Dan Klein, Rosh Ha'ayin (IL); Amin Hass, Arlington, VA (US)

(73) Assignee: Accenture Global Solutions Limited, Dublin (IE)

( * ) Notice: Subject to any disclaimer, the term of this patent is extended or adjusted under 35 U.S.C. 154(b) by 168 days.

(21) Appl. No.: 18/409,916

(22) Filed: Jan. 11, 2024

(65) Prior Publication Data

US 2024/0250979 A1 Jul. 25, 2024

Related U.S. Application Data

(60) Provisional application No. 63/480,562, filed on Jan. 19, 2023.

(51) Int. Cl.
*H04L 9/40* (2022.01)
*G06N 5/022* (2023.01)
*G06N 7/01* (2023.01)

(52) U.S. Cl.
CPC .......... *H04L 63/1433* (2013.01); *G06N 5/022* (2013.01); *G06N 7/01* (2023.01)

(58) Field of Classification Search
CPC ....... H04L 63/1433; G06N 7/01; G06N 5/022
(Continued)

(56) References Cited

U.S. PATENT DOCUMENTS

| 5,521,910 A | 5/1996 | Matthews |
| 6,279,113 B1 | 8/2001 | Vaidya |

(Continued)

FOREIGN PATENT DOCUMENTS

| EP | 1559008 | 8/2005 |
| EP | 1768043 | 3/2007 |

(Continued)

OTHER PUBLICATIONS

3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.

(Continued)

*Primary Examiner* — Liang Che A Wang
(74) *Attorney, Agent, or Firm* — Polsinelli PC

(57) ABSTRACT

Implementations include a computer-implemented method comprising: obtaining data representing observed conditions in an enterprise network, each observed condition being associated with at least one cybersecurity issue, a cybersecurity issue comprising one of (i) a vulnerability comprising an instance of a vulnerable condition or (ii) a weakness that is likely to cause a vulnerability to occur; using a plurality of exploitation prediction models to determine probabilities of exploitation of the cybersecurity issues associated with the observed conditions in the enterprise network, wherein the plurality of exploitation prediction models are trained using a knowledge mesh generated using data from cybersecurity repositories; assigning a priority ranking to each of (Continued)

the observed conditions in the enterprise network based on the respective probabilities of exploitation for the cybersecurity issues associated with the observed conditions; and performing one or more actions to mitigate the observed conditions in the enterprise network based on the priority rankings.

18 Claims, 8 Drawing Sheets

(58) Field of Classification Search
USPC .................................. 706/25; 709/223, 224
See application file for complete search history.

(56) References Cited

U.S. PATENT DOCUMENTS

| | | |
|---|---|---|
| 6,487,666 B1 | 11/2002 | Shanklin et al. |
| 7,540,025 B2 | 5/2009 | Tzadikario |
| 7,703,138 B2 | 4/2010 | Desai et al. |
| 7,904,962 B1 | 3/2011 | Jajodia et al. |
| 8,099,760 B2 | 1/2012 | Cohen et al. |
| 8,176,561 B1* | 5/2012 | Hurst ................ H04L 63/1433 726/1 |
| 8,656,493 B2 | 2/2014 | Capalik |
| 8,881,288 B1 | 11/2014 | Levy et al. |
| 9,166,997 B1 | 10/2015 | Guo et al. |
| 9,256,739 B1 | 2/2016 | Roundy et al. |
| 9,563,771 B2 | 2/2017 | Lang et al. |
| 9,633,306 B2 | 4/2017 | Liu et al. |
| 9,992,219 B1 | 6/2018 | Hamlet et al. |
| 10,084,804 B2 | 9/2018 | Kapadia et al. |
| 10,291,645 B1 | 5/2019 | Frantzen et al. |
| 10,382,473 B1 | 8/2019 | Ashkenazy et al. |
| 10,447,721 B2 | 10/2019 | Lasser |
| 10,447,727 B1 | 10/2019 | Hecht |
| 10,601,854 B2 | 3/2020 | Lokamathe et al. |
| 10,642,840 B1 | 5/2020 | Attaluri et al. |
| 10,659,488 B1 | 5/2020 | Rajasooriya et al. |
| 10,771,492 B2 | 9/2020 | Hudis et al. |
| 10,848,515 B1 | 11/2020 | Pokhrel et al. |
| 10,868,825 B1 | 12/2020 | Dominessy et al. |
| 10,873,533 B1 | 12/2020 | Ismailsheriff et al. |
| 10,956,566 B2 | 3/2021 | Shu et al. |
| 10,958,667 B1 | 3/2021 | Maida et al. |
| 11,038,900 B2 | 6/2021 | Jusko et al. |
| 11,089,040 B2 | 8/2021 | Jang et al. |
| 11,128,654 B1 | 9/2021 | Joyce et al. |
| 11,159,555 B2 | 10/2021 | Hadar et al. |
| 11,184,385 B2 | 11/2021 | Hadar et al. |
| 11,232,235 B2 | 1/2022 | Hadar et al. |
| 11,277,431 B2 | 3/2022 | Hassanzadeh et al. |
| 11,281,806 B2 | 3/2022 | Hadar et al. |
| 11,283,824 B1 | 3/2022 | Berger et al. |
| 11,283,825 B2 | 3/2022 | Grabois et al. |
| 11,411,976 B2 | 8/2022 | Basovskiy et al. |
| 11,483,213 B2 | 10/2022 | Engelberg et al. |
| 11,533,332 B2 | 12/2022 | Engelberg et al. |
| 11,676,087 B2 | 6/2023 | Hogg |
| 11,695,795 B2 | 7/2023 | Hadar et al. |
| 11,750,657 B2 | 9/2023 | Hadar et al. |
| 11,811,816 B2 | 11/2023 | Hadar et al. |
| 11,822,702 B2 | 11/2023 | Hadar et al. |
| 11,831,675 B2 | 11/2023 | Hassanzadeh et al. |
| 12,045,343 B2* | 7/2024 | Coull ................ G06N 20/00 |
| 2002/0104014 A1 | 8/2002 | Zobel et al. |
| 2005/0138413 A1 | 6/2005 | Lippmann et al. |
| 2005/0193250 A1 | 9/2005 | Takeuchi et al. |
| 2005/0193430 A1 | 9/2005 | Cohen et al. |
| 2006/0037077 A1 | 2/2006 | Gadde et al. |
| 2008/0044018 A1 | 2/2008 | Scrimsher et al. |
| 2008/0289039 A1 | 11/2008 | Rits et al. |
| 2008/0301765 A1 | 12/2008 | Nicol et al. |
| 2009/0077666 A1 | 3/2009 | Chen et al. |
| 2009/0138590 A1 | 5/2009 | Lee et al. |
| 2009/0307772 A1 | 12/2009 | Markham et al. |
| 2009/0319248 A1 | 12/2009 | White et al. |
| 2010/0058456 A1 | 3/2010 | Jajodia et al. |
| 2010/0138925 A1 | 6/2010 | Barai et al. |
| 2010/0174670 A1 | 7/2010 | Malik et al. |
| 2010/0325412 A1 | 12/2010 | Norrman et al. |
| 2011/0035803 A1 | 2/2011 | Lucangeli Obes et al. |
| 2011/0061104 A1 | 3/2011 | Sarraute Yamada et al. |
| 2011/0093916 A1 | 4/2011 | Lang et al. |
| 2011/0093956 A1 | 4/2011 | Laarakkers et al. |
| 2013/0097125 A1 | 4/2013 | Marvasti et al. |
| 2013/0219503 A1 | 8/2013 | Amnon et al. |
| 2014/0082738 A1 | 3/2014 | Bahl |
| 2014/0173740 A1 | 6/2014 | Albanese et al. |
| 2015/0047026 A1 | 2/2015 | Neil et al. |
| 2015/0058993 A1 | 2/2015 | Choi et al. |
| 2015/0106867 A1 | 4/2015 | Liang |
| 2015/0199207 A1 | 7/2015 | Lin et al. |
| 2015/0261958 A1 | 9/2015 | Hale et al. |
| 2015/0326601 A1 | 11/2015 | Grondin et al. |
| 2015/0350018 A1 | 12/2015 | Hui et al. |
| 2016/0105454 A1 | 4/2016 | Li et al. |
| 2016/0205122 A1 | 7/2016 | Bassett |
| 2016/0277423 A1 | 9/2016 | Apostolescu et al. |
| 2016/0292599 A1 | 10/2016 | Andrews et al. |
| 2016/0301704 A1 | 10/2016 | Hassanzadeh et al. |
| 2016/0301709 A1 | 10/2016 | Hassanzadeh et al. |
| 2017/0012836 A1 | 1/2017 | Tongaonkar et al. |
| 2017/0032130 A1 | 2/2017 | Joseph et al. |
| 2017/0041334 A1 | 2/2017 | Kahn et al. |
| 2017/0078322 A1 | 3/2017 | Seiver et al. |
| 2017/0085595 A1 | 3/2017 | Ng et al. |
| 2017/0163506 A1 | 6/2017 | Keller |
| 2017/0230410 A1 | 8/2017 | Hassanzadeh et al. |
| 2017/0286690 A1 | 10/2017 | Chari et al. |
| 2017/0318050 A1 | 11/2017 | Hassanzadeh et al. |
| 2017/0324768 A1 | 11/2017 | Crabtree et al. |
| 2017/0364702 A1 | 12/2017 | Goldfarb et al. |
| 2017/0366416 A1 | 12/2017 | Beecham et al. |
| 2018/0013771 A1 | 1/2018 | Crabtree et al. |
| 2018/0103052 A1 | 4/2018 | Choudhury et al. |
| 2018/0152468 A1 | 5/2018 | Nor et al. |
| 2018/0159890 A1 | 6/2018 | Warnick et al. |
| 2018/0176243 A1* | 6/2018 | Arnaldo ................ G06N 3/045 |
| 2018/0183827 A1 | 6/2018 | Zorlular et al. |
| 2018/0255077 A1 | 9/2018 | Paine |
| 2018/0255080 A1 | 9/2018 | Paine |
| 2018/0295154 A1 | 10/2018 | Crabtree et al. |
| 2018/0367548 A1 | 12/2018 | Stokes, III et al. |
| 2019/0052663 A1 | 2/2019 | Lee et al. |
| 2019/0052664 A1 | 2/2019 | Kibler et al. |
| 2019/0132344 A1 | 5/2019 | Lem et al. |
| 2019/0141058 A1 | 5/2019 | Hassanzadeh et al. |
| 2019/0182119 A1 | 6/2019 | Ratkovic et al. |
| 2019/0188389 A1 | 6/2019 | Peled et al. |
| 2019/0190955 A1 | 6/2019 | Khan et al. |
| 2019/0230129 A1 | 7/2019 | Digiambattista et al. |
| 2019/0312898 A1 | 10/2019 | Verma et al. |
| 2019/0319987 A1 | 10/2019 | Levy et al. |
| 2019/0362279 A1 | 11/2019 | Douglas |
| 2019/0370231 A1 | 12/2019 | Riggs et al. |
| 2019/0373005 A1 | 12/2019 | Bassett |
| 2020/0014718 A1 | 1/2020 | Joseph Durairaj et al. |
| 2020/0042328 A1 | 2/2020 | Gupta |
| 2020/0042712 A1 | 2/2020 | Foo et al. |
| 2020/0045069 A1 | 2/2020 | Nanda et al. |
| 2020/0099704 A1 | 3/2020 | Lee et al. |
| 2020/0112487 A1 | 4/2020 | Inamdar et al. |
| 2020/0128047 A1 | 4/2020 | Biswas et al. |
| 2020/0137104 A1 | 4/2020 | Hassanzadeh et al. |
| 2020/0175175 A1 | 6/2020 | Hadar et al. |
| 2020/0177615 A1 | 6/2020 | Grabois et al. |
| 2020/0177616 A1 | 6/2020 | Hadar et al. |
| 2020/0177617 A1 | 6/2020 | Hadar et al. |
| 2020/0177618 A1 | 6/2020 | Hassanzadeh et al. |
| 2020/0177619 A1 | 6/2020 | Hadar et al. |
| 2020/0272972 A1 | 8/2020 | Harry et al. |
| 2020/0296137 A1 | 9/2020 | Crabtree et al. |
| 2020/0311630 A1 | 10/2020 | Risoldi et al. |

(56) References Cited

U.S. PATENT DOCUMENTS

| | | | |
|---|---|---|---|
| 2020/0351295 | A1 | 11/2020 | Nhlabatsi et al. |
| 2020/0358804 | A1 | 11/2020 | Crabtree et al. |
| 2021/0006582 | A1 | 1/2021 | Yamada et al. |
| 2021/0014265 | A1 | 1/2021 | Hadar et al. |
| 2021/0099490 | A1 | 4/2021 | Crabtree et al. |
| 2021/0105294 | A1 | 4/2021 | Kruse et al. |
| 2021/0168175 | A1 | 6/2021 | Crabtree et al. |
| 2021/0173711 | A1 | 6/2021 | Crabtree et al. |
| 2021/0218770 | A1 | 7/2021 | Ben-Yosef et al. |
| 2021/0248443 | A1 | 8/2021 | Shu et al. |
| 2021/0273978 | A1 | 9/2021 | Hadar et al. |
| 2021/0288995 | A1 | 9/2021 | Attar et al. |
| 2021/0336981 | A1 | 10/2021 | Akella et al. |
| 2021/0406675 | A1 | 12/2021 | Carcano et al. |
| 2021/0409426 | A1 | 12/2021 | Engelberg et al. |
| 2021/0409439 | A1 | 12/2021 | Engelberg et al. |
| 2022/0014445 | A1 | 1/2022 | Engelberg et al. |
| 2022/0014534 | A1 | 1/2022 | Basovskiy et al. |
| 2022/0021698 | A1 | 1/2022 | Hadar et al. |
| 2022/0038491 | A1 | 2/2022 | Hadar et al. |
| 2022/0051111 | A1 | 2/2022 | Hadar et al. |
| 2022/0070202 | A1 | 3/2022 | Busany et al. |
| 2022/0124115 | A1 | 4/2022 | Grabois et al. |
| 2022/0129590 | A1 | 4/2022 | Hadar et al. |
| 2022/0131894 | A1 | 4/2022 | Hassanzadeh et al. |
| 2022/0150270 | A1 | 5/2022 | Klein et al. |
| 2022/0182406 | A1 | 6/2022 | Inokuchi |
| 2022/0188460 | A1 | 6/2022 | Hadar et al. |
| 2022/0263855 | A1 | 8/2022 | Engelberg et al. |
| 2022/0337617 | A1 | 10/2022 | Basovskiy et al. |
| 2022/0382878 | A1* | 12/2022 | Maity ............... G06F 16/245 |
| 2023/0021961 | A1 | 1/2023 | Engelberg et al. |
| 2023/0034910 | A1 | 2/2023 | Engelberg et al. |
| 2023/0067128 | A1 | 3/2023 | Engelberg et al. |
| 2023/0067777 | A1 | 3/2023 | Hadar et al. |
| 2023/0076372 | A1 | 3/2023 | Engelberg et al. |
| 2023/0208870 | A1* | 6/2023 | Yellapragada .......... H04L 63/20 726/22 |
| 2023/0208871 | A1* | 6/2023 | Yellapragada .......... G06N 3/045 726/25 |
| 2024/0037245 | A1* | 2/2024 | Kahan ................. H04L 63/1433 |
| 2024/0275798 | A1* | 8/2024 | Soler Garrido ... G06F 16/24578 |

FOREIGN PATENT DOCUMENTS

| | | | |
|---|---|---|---|
| EP | 2385676 | | 11/2011 |
| EP | 2816773 | | 12/2014 |
| EP | 3644579 | | 4/2020 |
| EP | 3664411 | | 6/2020 |
| EP | 3926539 | A1 * | 12/2021 ......... G06V 10/7784 |
| WO | WO 2018/002484 | | 1/2018 |
| WO | WO 2020/242275 | | 12/2020 |

OTHER PUBLICATIONS

Abraham et al. "A Predictive Framework for Cyber Security Analytics Using Attack Graphs." International Journal of Computer Networks & Communications (IJCNC). vol. 7, No. 1, Jan. 2015. (Year: 2015).

Abraham et al., "Cyber Security Analytics: A Stochastic Model for Security Quantification Using Absorbing Markov Chains," Journal of Communications, Dec. 2014, 9(12):899-907.

Almeida et al., "An ontological analysis of the notion of community in the RM-ODP enterprise language," Computer Standards & Interfaces, Mar. 2013, 35(3):257-268.

Alvarenga et al., "Discovering Attack Strategies Using Process Mining," Presented at Proceedings of The Eleventh Advanced International Conference on Telecommunications, Brussels, Belgium, Jun. 21-26, 2015, 119-125.

Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.

Annane et al., "BBO: BPMN 2.0 based ontology for business process representation," Presented at Proceedings of the 20th European Conference on Knowledge Management (ECKM 2019), Lisbonne, Portugal, Sep. 5-6, 2019, 49-59.

Ashton et al., "That 'internet of things' thing," RFID Journal, Jun. 22, 2009, 1 page.

Atoum et al., "A holistic cyber security implementation framework," Information. Management & Computer Security, Jul. 2014, 22(3):251-264.

Barik et al., "Attack Graph Generation and Analysis Techniques," Defence Science Journal, Nov. 2016, 66(6):559-567.

Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.

Barth et al., "A Learning-Based Approach to Reactive Security," arXiv (2009) (Year: 2009).

Bonacich, "Power and Centrality: A Family of Measures," American Journal of Sociology, Mar. 1987, 92(5):1170-1182.

Borgatti et al., "A Graph-theoretic perspective on centrality," Social Networks, Oct. 2006, 28(4):466-484.

Borgo et al., "Ontological Foundations of DOLCE," Theory and Applications of Ontology: Computer Applications, Aug. 5, 2010, 279-295.

Brazhuk, "Towards automation of threat modeling based on a semantic model of attack patterns and weaknesses," arXiv, Dec. 8, 2021, arXiv:2112.04231v1, 14 pages.

Burger et al., "Scaling to the end of silicon with edge architectures," Computer, Jul. 2004, 37(7):44-55.

Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.

Chen et al., "Distributed Attack Modeling Approach Based on Process Mining and Graph Segmentation," Entropy, Sep. 2020, 22(9):1026, 21 pages.

Chen Zhong, Towards Agile Cyber Analysis: Leveraging Visualization as Functions in Collaborative Visual Analytics, IEEE:2017, pp. 1-2.

Cohen-Addad et al., "Hierarchical Clustering: Objective Functions and Algorithms," Journal of the ACM, Jun. 2019, 66(4):26, 42 pages.

Coltellese et al., "Triage of IoT Attacks Through Process Mining," Presented at Proceedings of on the Move to Meaningful Internet Systems Conference 2019, Rhodes, Greece, Oct. 21-25, 2019; Lecture Notes in Computer Science, Oct. 2019, 11877:326-344.

Cravero, "Big data architectures and the internet of things: A systematic mapping study," IEEE Latin America Transactions, Apr. 2018, 16(4):1219-1226.

CyberSecurity Works.com [online], "MITRE Mapping of CISA KEVs and its Challenges," Jun. 29, 2022, retrieved on Oct. 4, 2022, retrieved from URL<https://cybersecurityworks.com/blog/cisa/mitre-mapping-of-cisa-kevs-and-its-challenges.html>, 6 pages.

Cycognito.com [online], "Identifying and Managing Vulnerabilities on All Your Attacker-Exposed Assets, All the Time: Benefits of the CyCognito Platform for Vulnerability Management," available on or before Oct. 22, 2020 via Internet Archive: Wayback Machine URL<https://web.archive.org/web/20201022120625/https://www.cycognito.com/vulnerability-management>, retrieved on Oct. 4, 2022, retrieved from URL<https://www.cycognito.com/vulnerability-management>, 15 pages.

Daniele et al., "An ontological approach to logistics," Enterprise Interoperability; Research and Applications in the Service-oriented Ecosystem, Oct. 11, 2013, 199-213.

Das et al., "V2W-BERT: A Framework for Effective Hierarchical Multiclass Classification of Software Vulnerabilities," CoRR, submitted on Feb. 23, 2021, arXiv:2102.11498v1, 11 pages.

Degen et al., "Gol: toward an axiomatized upper-level ontology," Presented at Proceedings of the International Conference on Formal Ontology in Information Systems, Ogunquit, Maine, USA, Oct. 17-19, 2001, 34-46.

(56) References Cited

OTHER PUBLICATIONS

Duarte et al., "Towards an Ontology of Requirements at Runtime," Formal Ontology in Information Systems, Jan. 2016, 283:255-268.
El Saddik, "Digital Twins: The Convergence of Multimedia Technologies," IEEE MultiMedia, Apr.-Jun. 2018, 25(2):87-92.
Enoch et al., "HARMer: Cyber-Attacks Automation and Evaluation," IEEE (Jul. 14, 2020) (Year: 2020).
EP Extended Search Report in European Appln. No. 21191752.1, dated Jan. 4, 2022, 8 pages.
EP Extended Search Report in European Appln. No. 22157487.4, dated Jun. 9, 2022, 10 pages.
EP Extended Search Report in European Appln. No. 22187514.9, dated Nov. 29, 2022, 7 pages.
EP Extended Search Report in European Appln. No. 22193272.6, dated Jan. 25, 2023, 8 pages.
EP Search Report in European Application No. EP 19212981, dated Mar. 4, 2020, 6 pages.
EP Search Report in European Application No. EP19212974, dated Feb. 14, 2020, 8 pages.
EP Search Report in European Application No. EP19212976, dated Feb. 14, 2020, 8 pages.
EP Search Report in European Application. No. 21159421.3, dated Jun. 30, 2021, 11 pages.
EP Search Report in European Application. No. EP20185251, dated Oct. 21, 2020, 7 pages.
Fielder et al., "Decision support approaches for cyber security investment," Decision Support Systems, Jun. 2016, 86:13-23.
Foundations of Databases, 1st ed., Abiteboul et al. (eds.), 1995, Chapter 12, 38 pages.
Fundamentals of Business Process Management, 2nd ed., Dumas et al. (eds.), 2018, 546 pages.
Gailly et al., "Ontological Reengineering of the REA-EO using UFO," Presented at Proceedings of the International Workshop on Ontology-Driven Software Engineering, Orlando, FL, USA, Oct. 2009, 15 pages.
Gandomi et al., "Beyond the hype: Big data concepts, methods, and analytics," International Journal of Information Management, Apr. 2015, 35(2):137-144.
GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.
Genovese, "Data mesh; the newest paradigm shift for a distributed architecture in the data world and its application," Thesis for the degree of Computer Engineering, Politecnico di Torino, 2021, 76 pages.
Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.
GitHub.com [online], "ALFA-group/BRON," available on or before Nov. 23, 2021 via Internet Archive: Wayback Machine URL<https://web.archive.org/web/20211123023700/https://github.com/ALFA-group/BRON>, retrieved on Oct. 4, 2022, retrieved from URL<https://github.com/ALFA-group/BRON>, 5 pages.
Giunchiglia et al., "Lightweight Ontologies," Technical Report DIT-07-071, University of Trento, Oct. 2007, 10 pages.
Gomez-Perez et al., "Ontology languages for the Semantic Web," IEEE Intelligent Systems, Feb. 2002, 17(1):54-60.
Grieves, "Virtually Intelligent Product Systems: Digital and Physical Twins", Complex Systems Engineering: Theory and Practice, Jul. 2019, 256:175-200.
Grigorescu et al., "CVE2ATT&CK: BERT-Based Mapping of CVEs to Mitre ATT&CK Techniques," Algorithms, Aug. 31, 2022, 15(9):314, 22 pages.
Guarino, "Formal Ontology in Information Systems," Presented at Proceedings of the Ist International Conference, Trento, Italy, Jun. 6-8, 1998, 3-15.
Guizzardi et al., "An Ontology-Based Approach for Evaluating the Domain Appropriateness and Comprehensibility Appropriateness of Modeling Languages," Models, 2005, 691-705.
Guizzardi, "On Ontology, ontologies, Conceptualizations, Modeling Languages, and (Meta)Models," Presented at Proceedings of the 2007 conference on Databases and Information Systems IV: Selected Papers from the Seventh International Baltic Conference, Amsterdam, Netherlands, Jun. 5, 2007, 18 pages.
Guizzardi, "Ontological Foundations for Structural Conceptual Models," Thesis for the degree of Doctor, University of Twente, 2005, 441 pages.
Guizzardi, "Ontology, Ontologies and the "I" of FAIR," Data Intelligence, Jan. 1, 2020, 2(1-2):181-191.
Guizzardi, "The role of foundational ontology for conceptual modeling and domain ontology representation," Presented at Proceedings of the 7th International Baltic Conference on Databases and Information Systems, Vilnius, Lithuania, Jul. 3-6, 2006, 9 pages.
Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.
Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.
Hansen et al., "Model-in-the-Loop and Software-in-the-Loop Testing of Closed-Loop Automotive Software with Arttest," Informatik, 2017, 13 pages.
Haque et al., "An Evolutionary Approach of Attack Graph to Attack Tree Conversion," Computer Network & Information Security (2017) (Year: 2017).
Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.
Hassani et al., "Artificial Intelligence (AI) or Intelligence Augmentation (IA): What Is the Future?," AI, Apr. 12, 2020, 1(2):143-155.
Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.
Hemberg et al., "Using a Collated Cybersecurity Dataset for Machine Learning and Artificial Intelligence," arXiv, Aug. 5, 2021, arXiv:2108.02618v1, 5 pages.
Herre, "General Formal Ontology (GFO): A Foundational Ontology for Conceptual Modelling," Theory and Applications of Ontology: Computer Applications, Aug. 12, 2010, 297-345.
Hofner et al., "Dijkstra, Floyd and Warshall meet Kleene," Formal Aspects of Computing, Jul. 2012, 24(4-6):459-476.
Horrocks et al., "SWRL: A Semantic Web Rule Language Combining OWL and RuleML," W3C Member Submission, May 21, 2004, 24 pages.
Husák et al., "Survey of Attack Projection, Prediction, and Forecasting in Cyber Security," IEEE Communications Surveys & Tutorials, Sep. 24, 2018, 21(1):640-660.
Idika et al., "Extending attack graph-based security metrics and aggregating their application," IEEE Transactions on Dependable and Secure Computing, Jan./Feb. 2012, 9(1):75-85.
IEEE, "IEEE Standard for eXtensible Event Stream (XES) for Achieving Interoperability in Event Logs and Event Stream," IEEE Std 1849™-2016, Sep. 22, 2016, 50 pages.
IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.
Ingols et al., "Practical Attack Graph Generation for Network Defense," 2006 22nd Annual Computer Security Applications Conference (ACSAC'06), Miami Beach, Florida, Dec. 11-15, 2006, 10 pages.
International Organization for Standardization, "International Standard: ISO/IEC 27001," ISO/IEC 27001:2013(E), Oct. 1, 2013, 29 pages.

(56) References Cited

OTHER PUBLICATIONS

Jacobsen et al., "FAIR Principles: Interpretations and Implementation Considerations," Data Intelligence, Jan. 1, 2020, 2(1-2):10-29.
Joint Task Force Transformation Initiative, "Security and Privacy Controls for Federal Information Systems and Organizations," National Institute of Standards and Technology Special Publication 800-53, Revision 4, Jan. 22, 2015, 462 pages.
Kaloroumakis et al., "Toward a Knowledge Graph of Cybersecurity Countermeasures," Technical Report, The MITRE Corporation, 2021, 11 pages.
Khouzani et al., "Scalable min-max multi-objective cyber-security optimization over probabilistic attack graphs", European Journal of Operational Research, Nov. 1, 2019, 278(3):894-903.
Li et al., "Cluster security research involving the modeling of network exploitations using exploitation graphs," Proceedings of the IEEE International Symposium on Cluster Computing and the Grid, Singapore, May 16-19, 2006, 11 pages.
Lippmann et al., "Validating and restoring defense in depth using attack graphs," Proceedings of the Military Communications Conference, Washington, DC, USA, Oct. 23-25, 2006, 10 pages.
Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.
Machado et al., "Data Mesh: Concepts and Principles of a Paradigm Shift in Data Architectures," Procedia Computer Science, 2022, 196:263-271.
Machado et al., "Data-Driven Information Systems: The Data Mesh Paradigm Shift," Presented at Proceedings of the 29th International Conference on Information Systems Development, Valencia, Spain, Sep. 8-10, 2021, 6 pages.
Makridakis, "The forthcoming artificial intelligence (ai) revolution: Its impact on society and firms," Futures, Jun. 2017, 90:46-60.
Manning Free Content Center [online], "Building Your Vocabulary," dated May 19, 2017, retrieved on Jun. 3, 2020, retrieved from URL <https://freecontent.manning.com/building-your-vocabulary/>, 10 pages.
Martins et al., "A framework for conceptual characterization of ontologies and its application in the cybersecurity domain," Software and Systems Modeling, Jul. 2, 2022, 21:1437-1464.
Martins et al., "Conceptual Characterization of Cybersecurity Ontologies," The Practice of Enterprise Modelling, Nov. 18, 2020, 323-338.
MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.
Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.
Mathis, "Data lakes," Datenbank-Spektrum, Oct. 6, 2017, 17(3):289-293.
Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.
Mitre.org [online], "CAPEC: Common Attack Pattern Enumerations and Classifications," available on or before Jul. 21, 2007 via Internet Archive: Wayback Machine URL<https://web.archive.org/web/20070721234158/https://capec.mitre.org/>, retrieved on Oct. 4, 2022, retrieved from URL<https://capec.mitre.org/>, 2 pages.
Mitre.org [online], "CWE: Common Weakness Enumeration," available on or before Oct. 9, 2006 via Internet Archive: Wayback Machine URL<https://web.archive.org/web/20061009060144/https://cwe.mitre.org/>, retrieved on Oct. 4, 2022, retrieved from URL<https://cwe.mitre.org/>, 1 page.
MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.
MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.
MITRE.org [online], "Service Application," available on or before Jun. 25, 2021 via Internet Archive: Wayback Machine URL<https://web.archive.org/web/20210625024952/https://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.
Monino, "Data Value, Big Data Analytics, and Decision-Making," Journal of the Knowledge Economy, Aug. 20, 2016, 256-267.
Murata, "Petri Nets: Properties, Analysis and Applications," Proceedings of the IEEE, Apr. 1989, 77(4):541-580.
Narmeen Zakaria Bawany; DDoS Attack Detection and Mitigation Using SDN: Methods, Practices, and Solutions; Springer-2017; p. 425-441.
National Institute of Standards and Technology [online], "National Vulnerability Database," last updated Jun. 2, 2020, retrieved on Jun. 3, 2020, retrieved from URL<https://nvd.nist.gov/>, 4 pages.
Neo4j.com [online], "Random Walk," available on or before Aug. 6, 2020 via. Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.
Neo4j.com [online], "Topological link prediction," available on or before May 17, 2020, via Internet Archive: Wayback Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.
Neo4j.com [online], "Yen's K-Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.
Networks: An Introduction, Newman (ed.), May 2010, 789 pages.
Noel et al., "CyGraph: Graph-Based Analytics and Visualization for Cybersecurity," Handbook of Statistics, Jan. 2016, 35:117-167.
Ortalo et al., "Experimenting with quantitative evaluation tools for monitoring operational security," IEEE Transactions on Software Engineering, Sep./Oct. 1999, 25(5):633-650.
Ou et al., "A Scalable Approach to Attack Graph Generation," Proceedings of the 13th ACM Conference on Computer and Communication Security, Oct. 2006, 336-345.
Ou et al., "MulVAL: A Logic-based Network Security Analyzer," 14th USENIX Security Symposium, Aug. 2005, Baltimore, MD, USA, 16 pages.
Phillips et al., "A graph-based system for network-vulnerability analysis," Proceedings of the 1998 Workshop on New Security Paradigms, Charlottesville, Virginia, Sep. 22-26, 1998, 71-79.
PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.
PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.

(56) References Cited

OTHER PUBLICATIONS

Process Mining, 1st ed., van der Aalst, 2011, Chapters 5-6, 63 pages.
Purvine et al., "A Graph-Based Impact Metric for Mitigating Latheral Movement Cyber Attacks", Automated Descision Making for Active Cyber Defence, Oct. 2016, pp. 45-52.
Q. Liu et al., "Latte: Large-Scale Lateral Movement Detection," MILCOM 2018—2018 IEEE Military Communications Conference (MILCOM), 2018, pp. 1-6, doi; 10.1109/MILCOM.2018.8599748. (Year: 2018).
Randhawa et al., "Mission-Centric Automated cyber Red Teaming," ACM (2018) (Year: 2018).
Rossi et al., "Knowledge Graph Embedding for Link Prediction: A Comparative Analysis," arXiv, Feb. 3, 2020, arXiv:2002.00819v1, 42 pages.
Sales et al., "Ontological anti-patterns in taxonomic structures, " Presented at Proceedings of ONTOBRAS 2019: XII Seminar on Ontology Research in Brazil, Porto Alegre, Brazil, Sep. 2-5, 2019, 13 pages.
Schatz et al., "Economic valuation for information security investment: a systematic literature review," Information Systems Frontiers, Apr. 18, 2016, 19:1205-1228.
Shandilya et al., "Use of Attack Graphs in Security Systems", Hindawi Journal of Computer Networks and Communications, Oct. 20, 2014, 2014:818957, 14 pages.
Shi et al., "Normalized Cuts and Image Segmentation," IEEE Transactions on Pattern Analysis and Machine Intelligence, Aug. 2000, 22(8):888-905.
Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html>, 11 pages.
Sitton-Candanedo et al., "A review of edge computing reference architectures and a new global edge proposal," Future Generation Computer Systems, Oct. 2019, 99:278-294.
SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.
Sourceforge.net [online], "XSB," last updated Oct. 29, 2017, retrieved on Jun. 3, 2020, retrieved from URL <http://xsb.sourceforge.net/>, 2 pages.
Stanek et al., "Method of comparing graph differencing algorithms for software differencing," 2008 IEEE International Conference on Electro/Information Technology, Ames, Iowa, May 18-20, 2008, 482-487.
Strom et al., "MITRE ATT&CK™: Design and Philosophy", The MITRE Corporation, Jul. 2018, 37 pages.
Swiler et al., "A graph-based network-vulnerability analysis system," Sandia National Laboratories, 1997, Tech. Rep. SAND97-3010/1, 25 pages.
Tan et al., "Future internet: The Internet of Things," Presented at Proceedings of the 2010 3rd International Conference on Advanced Computer Theory and Engineering (ICACTE), Chengdu, China, Aug. 20-22, 2010.
TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.
The Fourth Industrial Revolution, 1st. ed., Schwab, Jan. 2017, 218 pages.
The MITRE Corporation [online], "MITRE ATT&CK," last updated May 27, 2020, retrieved on Jun. 3, 2020, retrieved from URL <https://attack.mitre.org/>, 3 pages.
Ullah et al., "Towards Modeling Attacker's Opportunity for Improving Cyber Resilience in Energy Delivery Systems", Resilience Week, Aug. 2018, pp. 100-107.
Uschold et al., "Ontologies: Principles, methods and applications," The Knowledge Engineering Review, Jan. 1996, 11(2):93-136.
Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.
Van Heijst et al., "Using explicit ontologies in KBS development," International Journal of Human-Computer Studies, Feb. 1997, 46(2-3):183-292.
Vehicle Power Management, 1st ed., Zhang et al.(eds.), Aug. 2011, Chapter 10, 27 pages.
W3.org [online], "SWRL: A Semantic Web Rule Language Combining OWL and RuleML," May 21, 2004, retrieved on Oct. 4, 2022, retrieved from URL<https://www.w3.org/Submission/SWRL/>, 24 pages.
Wand et al., "On the deep structure of information systems," Information Systems Journal, Jul. 1995, 5(3):203-223.
Wang et al., "A Network Vulnerability Assessment Method Based on Attack Graph," 2018 IEEE 4th International Conference on Computer and Communications, Dec. 7-10, 2018, Chengdu, China, 1149-1154.
Wang et al., "Big data analytics in cyber security: network traffic and attacks," Journal of Computer Information Systems, Jan. 2020, 61(3):1-8.
Wang et al., "Exploring Attack Graph for Cost-benefit Security Hardening: A Probabilistic Approach," Computers & Security, Feb. 2013, 32:158-169.
Ward et al., "Threat Analysis and Risk Assessment in Automotive Cyber Security," SAE Int. J. Passeng. Cars Electron. Electr. Systems, May 2013, 6(2):507-513.
Wikipedia.org [online], "5G," last updated Jul. 9, 2021, retrieved on Jul. 9, 2021, retrieved from URL<https://en.wikipedia.org/wiki/5G>, 29 pages.
Wikipedia.org [online], "Active Directory," last updated Jun. 1, 2020, retrieved on Jun. 3, 2020, retrieved from URL <https://en.wikipedia.org/wiki/Active_Directory>, 14 pages.
Wikipedia.org [online], "Backward Chaining," last updated Nov. 16, 2019, retrieved on Jun. 3, 2020, retrieved from URL <https://en.wikipedia.org/wiki/Backward chaining>, 3 pages.
Wikipedia.org [online], "Breadth-first search," last updated Jul. 21, 2021, retrieved on Jul. 28, 2021, retrieved from URL<https://en.wikipedia.org/wiki/Breadth-first search>, 6 pages.
Wikipedia.org [online], "Cartesian Product," last updated Feb. 28, 2020, retrieved on Jun. 3, 2020, retrieved from URL <https://en.wikipedia.org/wiki/Cartesian_product>, 9 pages.
Wikipedia.org [online], "Centrality," last updated May 29, 2020, retrieved on Jun. 3, 2020, retrieved from URL <https://en.wikipedia.org/wiki/Centrality>, 15 pages.
Wikipedia.org [online], "Centrality," last updated Oct. 18, 2020, retrieved on Oct. 26, 2020, retrieved from URL<https://en.wikipedia.org/wiki/Centrality>, 15 pages.
Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.
Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.
Wikipedia.org [online], "Depth-first search," last updated Jun. 16, 2021, retrieved on Jul. 28, 2021, retrieved from URL<https://en.wikipedia.org/wiki/Depth-first_search>, 8 pages.
Wikipedia.org [online], "Digital twin," last updated Jul. 8, 2021, retrieved on Jul. 9, 2021, retrieved from URL<https://en.wikipedia.org/wiki/Digital_twin>, 13 pages.
Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.
Wikipedia.org [online], "Flood Fill," last updated Dec. 24, 2019, retrieved on Jun. 3, 2020, retrieved from URL <https://en.wikipedia.org/wiki/Flood_fill>, 7 pages.

(56) References Cited

OTHER PUBLICATIONS

Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.
Wikipedia.org [online], "Forward Chaining," last updated Nov. 18, 2019, retrieved on Jun. 3, 2020, retrieved from URL <https://en.wikipedia.org/wiki/Forward_chaining>, 3 pages.
Wikipedia.org [online], "Look-ahead (backtracking)," last updated May 23, 2020, retrieved on Jun. 3, 2020, retrieved from URL <https://en.wikipedia.org/wiki/Look-ahead (backtracking)>, 3 pages.
Wikipedia.org [online], "Natural language processing," last updated Jun. 10, 2022, retrieved on Jun. 14, 2022, retrieved from URL<https://en.wikipedia.org/wiki/Natural_language_processing>, 13 pages.
Wikipedia.org [online], "Reachability," last updated Oct. 22, 2021, retrieved on Jul. 13, 2022, retrieved from URL<https://en.wikipedia.org/wiki/Reachability>, 5 pages.
Wikipedia.org [online], "SCADA," last updated Jun. 2, 2020, retrieved on Jun. 3, 2020, retrieved from URL <https://en.wikipedia.org/wiki/SCADA>, 12 pages.
Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.
Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.
Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.
Wikipedia.org [online], "Traffic flow," last updated Oct. 19, 2020, retrieved on Oct. 26, 2020, retrieved from URL<https://en.wikipedia.org/wiki/Traffic_flow>; 41 pages.
Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.
Wu et al., "A service-oriented architecture for business intelligence," Presented at Proceedings of the IEEE International Conference on Service-Oriented Computing and Applications (SOCA '07), Newport Beach, CA, USA, Jun. 19-20, 2007, 279-285.
X. Li, C. Zhang, T. Jung, J. Qian and L. Chen, "Graph-based privacy-preserving data publication," IEEE Infocom 2016—The 35th Annual IEEE International Conference on Computer Communications, 2016, pp. 1-9, doi: 10.1109/INF000M.2016.7524584. (Year: 2016).
Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.
Yi et al., "Overview on attack graph generation and visualization technology," 2013 International Conference on Anti-Counterfeiting, Security and Identification (ASID), Shanghai, China, Oct. 25-27, 2013, 6 pages.
You et al., "A Review of Cyber Security Controls from an ICS Perspective," Proceedings of 2018 International Conference on Platform Technology and Service (PlatCon), Jan. 29-31, 2018, Jeju, South Korea, 5 pages.
Zeng et al., "Survey of Attack Graph Analysis Methods from the Perspective of Data and Knowledge Processing," Hindawi Security and Communication Networks, Dec. 26, 2019, 2019:2031063, 17 pages.
Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.
Zhang et al., "Optimal Decision-Making Approach for Cyber Security Defense Using Game Theory and Intelligent Learning," Security and Communication Networks, Dec. 23, 2019, 2019:3038586, 17 pages.
Zhao et al., "Attack graph analysis method for large scale network security hardening," J. Front. Comput. Sci. Technology, 2018, 12(2):263-273 (with English Abstract).

* cited by examiner

AUTOMATED CYBERSECURITY VULNERABILITY PRIORITIZATION

CROSS-REFERENCE TO RELATED APPLICATIONS

This application claims priority to U.S. 63/480,562 filed on Jan. 19, 2023, the disclosure of which is expressly incorporated herein by reference in the entirety.

BACKGROUND

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, and alert security personnel to such occurrences.

Modern computer networks are largely segregated and often deployed with diverse cyber defense mechanisms, which makes it challenging for an attacker (hacker) to gain direct access to a target (e.g., administrator credentials). This pattern is commonly seen in industrial control systems (ICSs) where a layered architecture ensures that targets are not in close proximity to the perimeter.

Organizations can use security sensors to identify, understand, and triage security issues in the emerging threat landscape. Such security tools provide identifiers of issues detected, normally in form of common vulnerabilities and exposures (CVE) and common weakness enumeration (CWE). In some examples, dedicated advisories issued by the security sensors can be used to provide deeper analysis in freeform text. The fusion of information can be used to provide a holistic view of the organizations by aggregating various sensors. Security issues can be classified by unified taxonomy or frameworks.

Organizations can use detection methods to discover vulnerable software components, such as static application security testing (SAST), dynamic application security testing (DAST), and more. These scanning methods discover security flaws and vulnerabilities in code and utilize frameworks. When a flaw is discovered, it is desirable to prioritize mitigating actions based on the severity of the flaw and the likelihood that the flaw will be exploited.

SUMMARY

Implementations of the present disclosure are directed to system and methods to prioritize cybersecurity remediation steps based on contextual historical exploits. A cybersecurity platform can detect vulnerabilities and weaknesses in applications. The platform can provide detected vulnerabilities to exploitation prediction machine learning models that are trained to predict the likelihood vulnerabilities to be exploited in the context of a specific application or product. The exploitation prediction machine learning models are trained with a knowledge graph representation of cybersecurity information integrated from multiple different sources. The platform can use the predicted likelihood of exploitation to prioritize flaws for repair and mitigation actions.

In some examples, implementations of the present disclosure are provided within an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems.

In some implementations, actions include obtaining data representing observed conditions in an enterprise network, each observed condition being associated with at least one cybersecurity issue, wherein a cybersecurity issue comprises one of (i) a vulnerability comprising an instance of a vulnerable condition or (ii) a weakness that is likely to cause a vulnerability to occur; using a plurality of exploitation prediction models to determine probabilities of exploitation of the cybersecurity issues associated with the observed conditions in the enterprise network, wherein the plurality of exploitation prediction models are trained using a knowledge mesh generated using data from one or more cybersecurity repositories; assigning a priority ranking to each of the observed conditions in the enterprise network based on the respective probabilities of exploitation for the cybersecurity issues associated with the observed conditions; and performing one or more actions to mitigate the observed conditions in the enterprise network based on the respective priority rankings.

Other implementations of this aspect include corresponding systems, apparatus, and computer programs, configured to perform the actions of the methods, encoded on computer storage devices.

These and other implementations can optionally include one or more of the following features: the method comprises training, using the knowledge mesh, the plurality of exploitation prediction models to determine probabilities of exploitation of cybersecurity issues, wherein the knowledge mesh includes a plurality of modules, each module maintaining a knowledge graph generated using data from the one or more cybersecurity repositories; training, using the knowledge mesh, the plurality of exploitation prediction models to determine probabilities of exploitation of cybersecurity issues comprises: training a first model to determine probabilities of exploitation of vulnerabilities; and training a second model to determine probabilities of exploitation of weaknesses; using the plurality of exploitation prediction models to determine probabilities of exploitation of the observed conditions comprises: extracting, from the obtained data, vulnerabilities associated with the observed conditions, providing, as input to the first model, the vulnerabilities, obtaining, as output from the first model, respective probabilities of exploitation for each of the vulnerabilities; using the plurality of exploitation prediction models to determine probabilities of exploitation of the observed conditions comprises: extracting, from the obtained data, weaknesses associated with the observed conditions, providing, as input to the second model, the weaknesses, and obtaining, as output from the second model, respective probabilities of exploitation for each of the weaknesses; the first model comprises a first machine learning model of a first set of machine learning models trained to determine probabilities of exploitation of vulnerabilities; the method comprises: training the first set of machine learning models to determine probabilities of exploitation of vulnerabilities; evaluating each of the first set of machine learning models including determining, for each of the plurality of exploitation prediction models, an accuracy, a false positive rate, and a false negative rate; and selecting the first model from the first set of machine learning models based on evaluating each of the first set of machine learning models; the second model comprises a second machine learning model of a second set of machine learning models trained to determine probabilities of exploitation of vulnerabilities; the method comprises: training the second set of machine learning models to determine probabilities of exploitation of vulnerabilities; evaluating each of the second set of machine learning models including determining, for each of the plurality of exploitation prediction models, an accuracy, a false positive rate, and a false negative rate; and selecting the second model from the second set of machine learning models based on evaluating each of the second set of machine learning models; the knowledge mesh includes historical data indicating, for each of multiple cybersecurity issues, whether the cybersecurity issue has been exploited; training, using the knowledge mesh, an exploitation prediction model of the plurality of exploitation prediction models to determine probabilities of exploitation of cybersecurity issues comprises: providing, as input to the exploitation prediction model, training samples generated from the knowledge mesh, a training sample comprising: information identifying the cybersecurity issue, and a label indicating whether the cybersecurity issue has been exploited; the data indicating vulnerabilities includes, for each vulnerability, a textual description and a severity score; a probability of exploitation of a cybersecurity issue comprises: a likelihood that the exploitation of the cybersecurity issue will occur; and a likelihood that the exploitation of the cybersecurity issue will not occur; the observed conditions include a first condition that is associated with a first vulnerability and is associated with a first weakness, the method further comprising: obtaining output from the first model indicating a first probability of exploitation for the first vulnerability; obtaining output from the second model indicating a second probability of exploitation for the first weakness; and assigning a priority ranking to the first condition based on at least one of the first probability of exploitation for the first vulnerability and the second probability of exploitation for the first weakness; the first probability of exploitation for the first vulnerability is the same as the second probability of exploitation for the first weakness; the first probability of exploitation for the first vulnerability is different than the second probability of exploitation for the first weakness; the method comprises: assigning the priority ranking to the first condition based on a combination of the first probability of exploitation and the second probability of exploitation; the method comprises: assigning the priority ranking to the first condition based on the first probability of exploitation or the second probability of exploitation.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
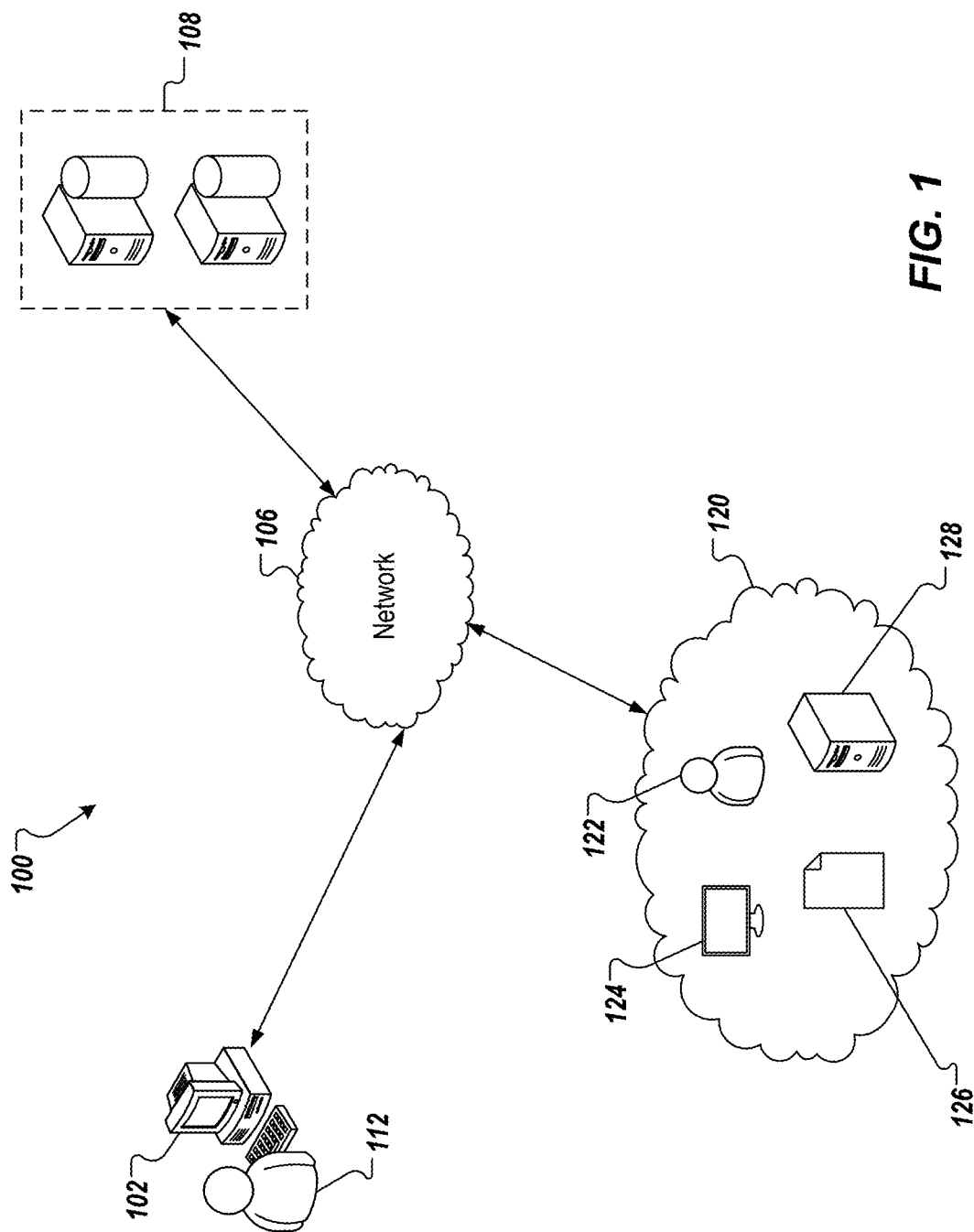
FIG. 1 depicts an example architecture that can be used to execute implementations of the present disclosure.

Implementations of the present disclosure are directed to system and methods to prioritize cybersecurity remediation steps based on contextual historical exploits. A cybersecurity platform can detect vulnerabilities and weaknesses in applications. The platform can provide detected vulnerabilities to exploitation prediction machine learning models that are trained to predict the likelihood vulnerabilities to be exploited in the context of a specific application or product. The exploitation prediction machine learning models are trained with a knowledge graph representation of cybersecurity information integrated from multiple different sources. The platform can use the predicted likelihood of exploitation to prioritize flaws for repair and mitigation actions.

The disclosed techniques can be used for prioritization of fixing issues in various use cases. Application scanning can identify flaws in code (CWEs), vulnerabilities in third-party modules (CVEs), or both. Cloud infrastructure security scanning can identify misconfigurations. Not every detected security issue is likely to be exploited. Thus, scanning processes can result in detected security issues that are overprioritized or underprioritized.

The disclosed techniques use data representing historical exploits as context to provide better remediation. These techniques can be implemented to reduce the cybersecurity risk to applications, networks, and systems. Cybersecurity mitigation actions are prioritized for the vulnerabilities and weaknesses that are most likely to be exploited.

The disclosed techniques can be implemented to reduce the number of cybersecurity issues that are identified for remediation. This can reduce the number of changes to be made. For example, prior to prioritizing detected cybersecurity issues, a security platform may identify hundreds or thousands of cybersecurity issues for remediation. After prioritizing the detected cybersecurity issues, a security platform can reduce the number of cybersecurity issues identified for remediation to tens of issues for correction. Performing corrections for fewer cybersecurity issues results in improved security, reduced time, reduced memory, and reduced processing power needed to identify and perform the corrections.

In some examples, implementations of the present disclosure are provided within an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems.

To provide context for implementations of the present disclosure, and as introduced above, modern computer networks are largely segregated and often deployed with diverse cyber defense mechanisms, which makes it challenging for an attacker (hacker) to gain direct access to a target (e.g., administrator credentials). This pattern is commonly seen in industrial control system (ICSs) where a layered architecture ensures that targets are not in close proximity to the perimeter. Despite the presence of a layered architecture, the spate of attacks is increasing rapidly and span from large enterprises to the critical infrastructure (CINF) networks. Due to the potential severe damage and cost experienced by a victim nation, CINF networks have been intentionally targeted and have suffered from significant losses when successfully exploited.

In general, attacks on CINF networks occur in multiple stages. Consequently, detecting a single intrusion does not necessarily indicate the end of the attack as the attack could have progressed far deeper into the network. Accordingly, individual attack footprints are insignificant in an isolated manner, because each is usually part of a more complex multi-step attack. That is, it takes a sequence of steps to form an attack path toward a target in the network. Researchers have investigated several attack path analysis methods for identifying attacker's required effort (e.g., number of paths to a target and the cost and time required to compromise each path) to diligently estimate risk levels. However, traditional techniques fail to consider important features and provide incomplete solutions for addressing real attack scenarios. For example, some traditional techniques only consider topological connections to measure the difficulty of reaching a target. As another example, some traditional techniques only assume some predefined attacker skill set to estimate the path complexity. In reality, an attacker's capabilities and knowledge of the enterprise network evolve along attack paths to the target.

Cyber-security repositories have been developed over the years, which serve as central knowledge bases for cyber-security experts to discover information about vulnerabilities, their potential exploitations, and countermeasures. Example repositories include as MITRE provided by The MITRE Corporation (www.mitre.org), the National Vulnerability Database (NVD) provided by the National Institute of Standards and Technology of the U.S. Department of Commerce (nvd.nist.gov), and those provided by the Open Web Application Security Project (OWASP) (owasp.org). Such a knowledge can be leveraged for a cyber-security recommender system (e.g., example functionality of the agile security platform discussed herein) that will accelerate the expert search and provide deep insights that are not explicitly available in these repositories individually, and particularly, collectively.

In view of the above context, implementations of the present disclosure are directed to a Security Mesh Enhanced Sagacity Hub (SMESH) that is generated by mining multiple cyber-security repositories and constructing the SMESH to include a knowledge mesh that represents insights determined from the cyber-security repositories, collectively. More particularly, and as described in further detail herein, implementations of the present disclosure include mining multiple cyber-security repositories and constructing a knowledge mesh having an underlying data federation architecture.

Implementations of the present disclosure further provide a set of methods that enable self-evolvement of the knowledge mesh. The resulting knowledge mesh enables advanced capabilities towards cyber-security. For example, the knowledge mesh can be used to enrich security findings reports with potential attack scenarios and other exploitation information, and recommend the most effective countermeasures to avoid a detected vulnerability, among many other use cases. Implementations of the present disclosure address challenges in collating information from the multiple cyber-security repositories. For example, implementations of the present disclosure address representation of multiple cyber-security information sources in a manner that will keep each repository independent, while enabling the usage of semantics across the multiple repositories. As another example, implementations of the present disclosure address performance of information completion over the knowledge mesh. As another example, implementations of the present disclosure address use of the knowledge mesh in a cyber-security recommender system (e.g., functionality provided by the agile security platform) for multiple tasks (e.g., exploitation analysis, countermeasure recommendation).

As described herein, an agile security platform enables continuous cyber- and enterprise-operations alignment controlled by risk management. The agile security platform improves decision-making by helping enterprises to prioritize security actions that are most critical to their operations. In some examples, the agile security platform combines methodologies from agile software development lifecycle, IT management, development operations (DevOps), and analytics that use artificial intelligence (AI). In some examples, agile security automation bots continuously analyze attack probability, predict impact, and recommend prioritized actions for cyber risk reduction. In this manner, the agile security platform enables enterprises to increase operational efficiency and availability, maximize existing cyber-security resources, reduce additional cyber-security costs, and grow organizational cyber resilience.

As described in further detail herein, the agile security platform provides for discovery of IT/OT supporting elements within an enterprise, which elements can be referred to as configuration items (CI). Further, the agile security platform can determine how these CIs are connected to provide a CI network topology. In some examples, the CIs are mapped to processes and services of the enterprise, to determine which CIs support which services, and at what stage of an operations process. In this manner, a services CI topology is provided.

In some implementations, the specific vulnerabilities and improper configurations of each CI are determined and enable a list of risks to be mapped to the specific IT/OT network of the enterprise. Further, the agile security platform of the present disclosure can determine what a malicious user (hacker) could do within the enterprise network, and whether the malicious user can leverage additional elements in the network such as scripts, CI configurations, and the like. Accordingly, the agile security platform enables analysis of the ability of a malicious user to move inside the network, namely, lateral movement within the network. This includes, for example, how a malicious user could move from one CI to another CI, what CI (logical or physical) can be damaged, and, consequently, damage to a respective service provided by the enterprise.

In accordance with implementations of the present disclosure, the agile security platform can generate a knowledge mesh by mining information from multiple cyber-security repositories, and use the knowledge mesh for cyber-security related tasks, such as exploitation analysis and countermeasure recommendation. While implementations of the present disclosure are described in detail herein with reference to the agile security platform, it is contemplated that implementations of the present disclosure can be realized with any appropriate cyber-security platform.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120 as well as store, retrieve, transmit, and/or manipulate data. In some examples, the enterprise network 120 includes multiple assets. Example assets include, without limitation, users 122, computing devices 124, electronic documents 126, and servers 128.

In some implementations, the agile security platform is hosted within the server system 108, and monitors and acts on the enterprise network 120, as described herein. More particularly, and as described in further detail herein, one or more AAGs representative of the enterprise network are generated in accordance with implementations of the present disclosure. For example, the agile security platform detects IT/OT assets and generates an asset inventory and network maps, as well as processing network information to discover vulnerabilities in the enterprise network 120. The agile security platform generates and uses a knowledge mesh in accordance with implementations of the present disclosure.

Figure 2:
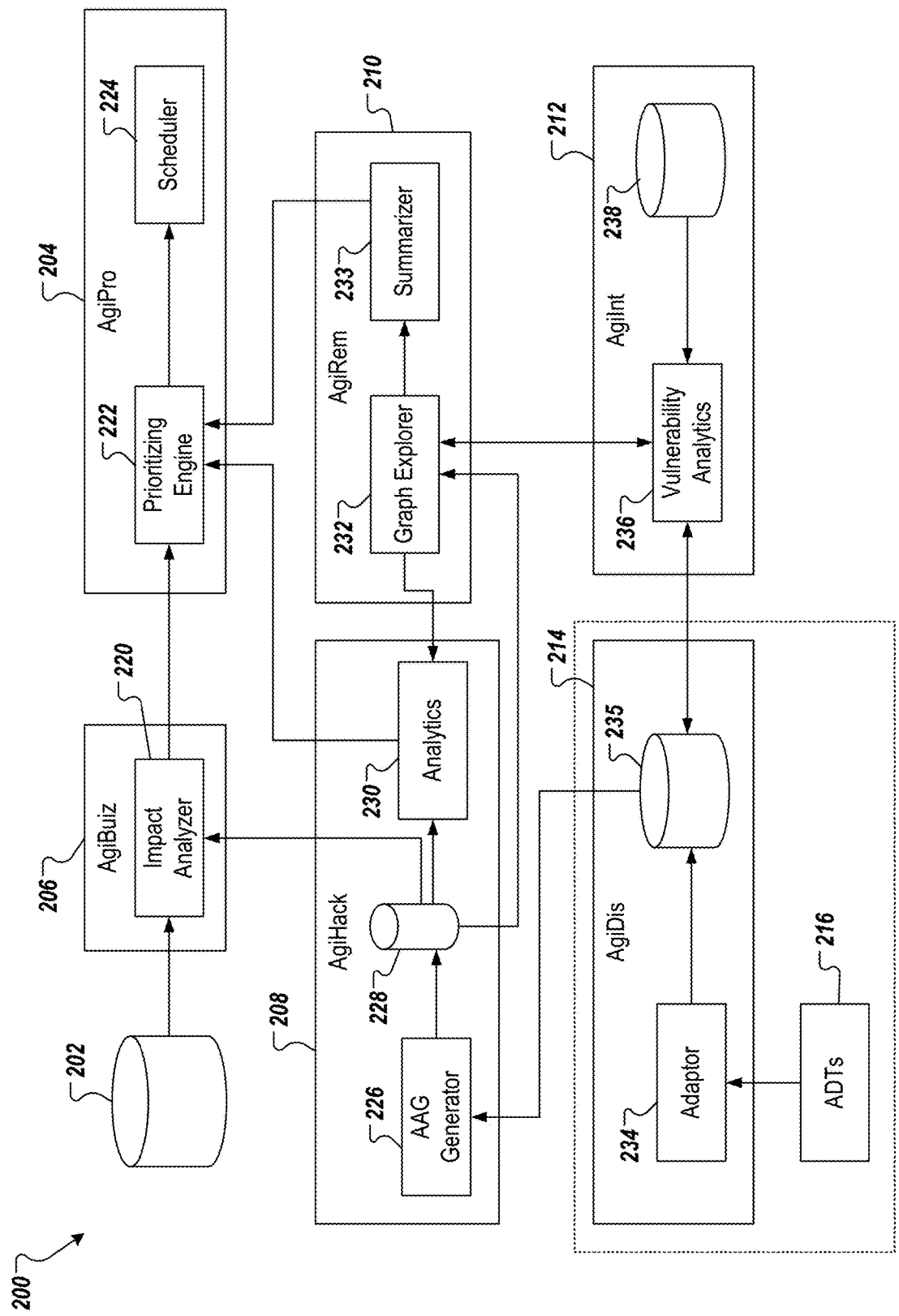
FIG. 2 depicts an example conceptual architecture of an agile security platform in accordance with implementations of the present disclosure.

FIG. 2 depicts an example conceptual architecture 200 of an agile security (AgiSec) platform. The conceptual architecture 200 depicts a set of security services of the AgiSec platform, which include: an agile security prioritization (AgiPro) service 204, an agile security business impact (AgiBuiz) service 206, an agile security remediation (AgiRem) service 210, an agile security hacker lateral movement (AgiHack) service 208, an agile security intelligence (AgiInt) service 212, and an agile security discovery (AgiDis) service 214. The conceptual architecture 200 also includes an operations knowledge base 202 that stores historical data provided for an enterprise network (e.g., the enterprise network 120).

In the example of FIG. 2, the AgiDis service 214 includes an adaptor 234, and an asset/vulnerabilities knowledge base 235. In some examples, the adaptor 234 is specific to an asset discovery tool (ADT) 216. Although a single ADT 216 is depicted, multiple ADTs can be provided, each ADT being specific to an IT/OT site within the enterprise network. Because each adaptor 234 is specific to an ADT 216, multiple adaptors 234 are provided in the case of multiple ADTs 216.

In some implementations, the AgiDis service 214 detects IT/OT assets through the adaptor 234 and respective ADT 216. In some implementations, the AgiDis service 214 provides both active and passive scanning capabilities to comply with constraints, and identifies device and service vulnerabilities, improper configurations, and aggregate risks through automatic assessment. The discovered assets can be used to generate an asset inventory, and network maps. In general, the AgiDis service 214 can be used to discover assets in the enterprise network, and a holistic view of network and traffic patterns. More particularly, the AgiDis service 214 discovers assets, their connectivity, and their specifications and stores this information in the asset/vulnerabilities knowledge base 235. In some implementations, this is achieved through passive network scanning and device fingerprinting through the adaptor 234 and ADT 216. The AgiDis service 214 provides information about device models.

In the example of FIG. 2, the AgiInt service 212 includes a vulnerability analytics module 236 and a threat intelligence knowledge base 238 (e.g., CVE, CAPEC, CWE, iDefence API, vendor-specific databases). In some examples, the AgiInt service 212 discovers vulnerabilities in the enterprise network based on data provided from the AgiDis service 214. In some examples, the vulnerability analytics module 236 processes data provided from the AgiDis service 214 to provide information regarding possible impacts of each vulnerability and remediation options (e.g., permanent fix, temporary patch, workaround) for defensive actions. In some examples, the vulnerability analytics module 236 can include an application programming interface (API) that pulls out discovered vulnerabilities and identifies recommended remediations using threat intelligence feeds. In short, the AgiInt service 212 maps vulnerabilities and threats to discovered IT/OT assets. The discovered vulnerabilities are provided back to the AgiDis service 214 and are stored in the asset/vulnerabilities knowledge base 235 with their respective assets.

In the example of FIG. 2, the AgiHack service 208 includes an analytical attack graph (AAG) generator 226, an AAG database 228, and an analytics module 230. In general, the AgiHack service 208 generates AAGs using resource-efficient AAG generation, and evaluates hacking exploitation complexity. In some examples, the AgiHack service 208 understands attack options, leveraging the vulnerabilities to determine how a hacker would move inside the network and identify targets for potential exploitation. The AgiHack service 208 proactively explores adversarial options and creates AAGs representing possible attack paths from the adversary's perspective.

In further detail, the AgiHack service 208 provides rule-based processing of data provided from the AgiDis service 214 to explore all attack paths an adversary can take from any asset to move laterally towards any target (e.g., running critical operations). In some examples, multiple AAGs are provided, each AAG corresponding to a respective target within the enterprise network. Further, the AgiHack service 208 identifies possible impacts on the targets. In some examples, the AAG generator 226 uses data from the asset/vulnerabilities knowledge base 235 of the AgiDis service 214, and generates an AAG. In some examples, the AAG graphically depicts, for a respective target, all possible impacts that may be caused by a vulnerability or network/system configuration, as well as all attack paths from anywhere in the network to the respective target. In some examples, the analytics module 230 processes an AAG to identify and extract information regarding critical nodes, paths for every source-destination pair (e.g., shortest, hardest, stealthiest), most critical paths, and critical vulnerabilities, among other features of the AAG. If remediations are applied within the enterprise network, the AgiHack service 208 updates the AAG.

In the example of FIG. 2, the AgiRem service 210 includes a graph explorer 232 and a summarizer 233. In general, the AgiRem service 210 provides remediation options to avoid predicted impacts. For example, the AgiRem service 210 provides options to reduce lateral movement of hackers within the network and to reduce the attack surface. The AgiRem service 210 predicts the impact of asset vulnerabilities on the critical processes and adversary capabilities along kill chain/attack paths and identifies the likelihood of attack paths to access critical assets and prioritizes the assets (e.g., based on shortest, easiest, stealthiest). The AgiRem service 210 identifies remedial actions by exploring attack graph and paths. For example, the AgiRem service 210 can execute a cyber-threat analysis framework that characterizes adversarial behavior in a multi-stage cyber-attack process, as described in further detail herein.

In further detail, for a given AAG (e.g., representing all vulnerabilities, network/system configurations, and possible impacts on a respective target) generated by the AgiHack service 208, the AgiRem service 210 provides a list of efficient and effective remediation recommendations using data from the vulnerability analytics module 236 of the AgiInt service 212. In some examples, the graph explorer 232 analyzes each feature (e.g., nodes, edges between nodes, properties) to identify any condition (e.g., network/system configuration and vulnerabilities) that can lead to cyber impacts. Such conditions can be referred to as issues. For each issue, the AgiRem service 210 retrieves remediation recommendations and courses of action (CoA) from the AgiInt service 212, and/or a security knowledge base (not shown). In some examples, the graph explorer 232 provides feedback to the analytics module 230 for re-calculating critical nodes/assets/paths based on remediation options. In some examples, the summarizer engine 233 is provided as a natural language processing (NLP) tool that extracts concise and salient text from large/unstructured threat intelligence feeds. In this manner, the AgiSec platform can convey information to enable users (e.g., security teams) to understand immediate remedial actions corresponding to each issue.

In the example of FIG. 2, the AgiBuiz service 206 includes an impact analyzer 220. In general, the AgiBuiz service 206 associates services that are provided by the enterprise with IT/OT assets, generates a security map, identifies and highlights risks and possible impacts on enterprise operations and industrial processes, and conducts what-if prediction analyses of potential security actions remediations on service health levels. In other words, the AgiBuiz service 206 identifies risk for each impact predicted by the AgiHack service 208. In some examples, the impact analyzer 220 interprets cyber risks and possible impacts (e.g., financial risk) based on the relative importance of each critical asset and its relative value within the entirety of the enterprise operations. The impact analyzer 220 processes one or more models to compare the financial risks caused by cyber-attacks with those caused by system unavailability due to shutdown time for replacing/patching critical assets.

In the example of FIG. 2, the AgiPro service 204 includes a prioritizing engine 222 and a scheduler 224. In some implementations, the AgiPro service 204 prioritizes the remediation recommendations based on their impact on the AAG size reduction and risk reduction on the value. In some examples, the AgiPro service 204 determines where the enterprise should preform security enforcement first, in order to overall reduce the risks discovered above, and evaluate and probability to perform harm based on the above lateral movements by moving from one CI to another. In some examples, the AgiPro service 204 prioritizes remedial actions based on financial risks or other implications, provides risk reduction recommendations based on prioritized remediations, and identifies and tracks applied remediations for risks based on recommendations.

In some examples, the prioritizing engine 222 uses the calculated risks (e.g., risks to regular functionality and unavailability of operational processes) and the path analysis information from the analytics module 230 to prioritize remedial actions that reduce the risk, while minimizing efforts and financial costs. In some examples, the scheduler 224 incorporates the prioritized CoAs with operational maintenance schedules to find the optimal time for applying each CoA that minimizes its interference with regular operational tasks.

Figure 3:
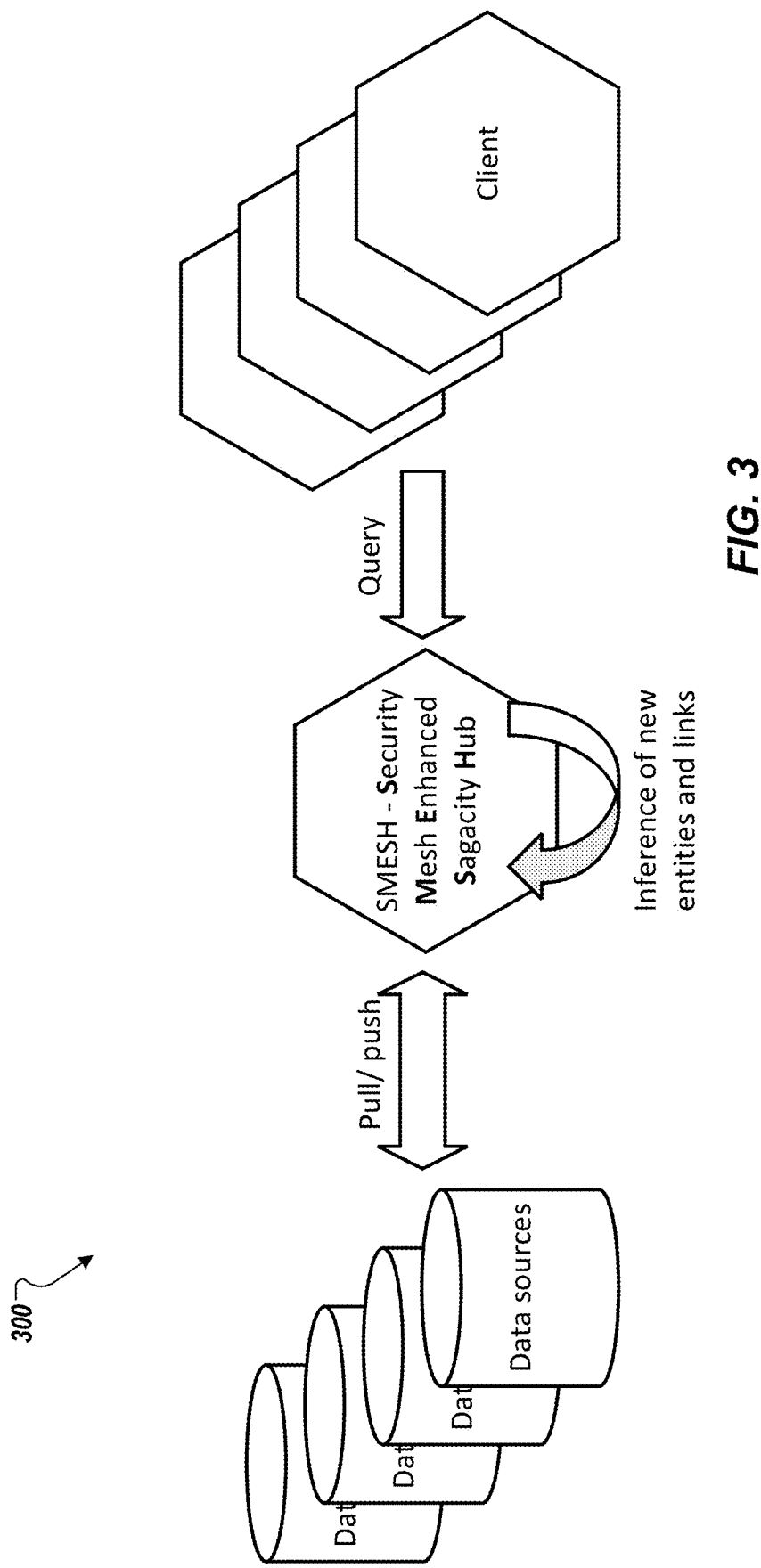
FIG. 3 depicts a high-level architecture using a knowledge mesh provided in accordance with implementations of the present disclosure.

FIG. 3 depicts a high-level architecture 300 using a knowledge mesh provided in accordance with implementations of the present disclosure. In some implementations, a SMESH gathers information from multiple cyber-security data sources, and applies a continuous inference process to infer entities and links from the information. The SMESH provides a knowledge mesh, as described herein, which can be queried by clients. Multiple client types can submit queries, such as, a cloud security advisor, a red team, and the like.

Figure 4:
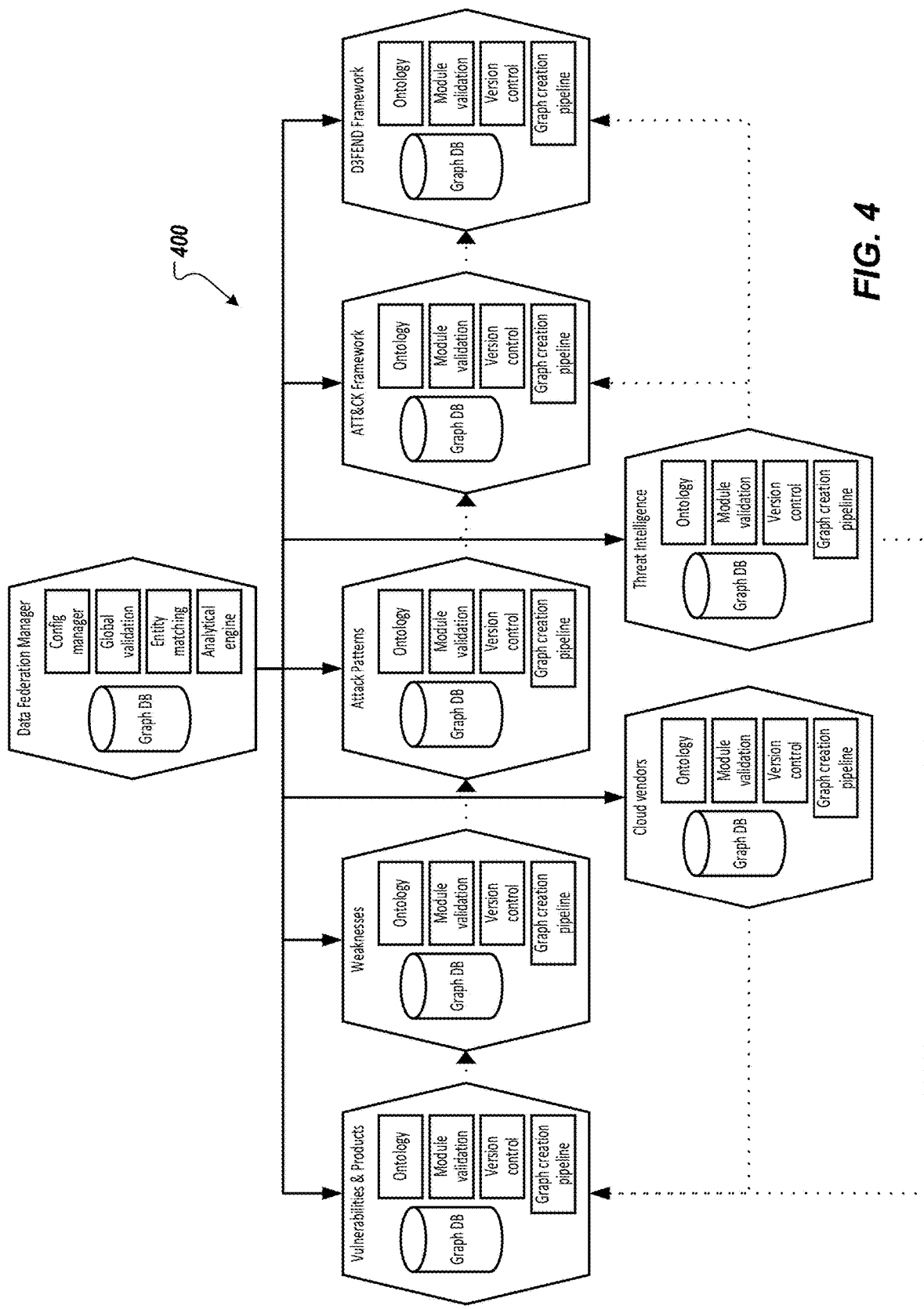
FIG. 4 depicts an example representation of a data federation architecture in accordance with implementations of the present disclosure.

FIG. 4 depicts an example representation of a data federation architecture 400 in accordance with implementations of the present disclosure. The SMESH holds a data federation architecture under the hood. In the example of FIG. 4, the SMESH is composed of a data federation manager and a set of modules. Each module maintains a knowledge graph. The knowledge graphs can be integrated together to form the knowledge mesh. Each knowledge graph can be associated with a respective aspect of cyber-security In some examples, the SMESH includes a set of modules, each module associated with a respective aspect and providing a knowledge graph specific to the respective aspect.

In some examples, the set of modules can be added, aggregated, and/or segregated. Each module in the set of modules is registered with the data federation manager and corresponds to a respective aspect. Example aspects include, without limitation, vulnerabilities and products, weaknesses, cloud vendors, attack patterns, threat intelligence, ATT&CK framework, and D3FEND framework.

In some implementations, the data federation manager is in charge of global management of the set of modules. In the example of FIG. 4, the data federation manager includes a configuration manager, an entity matcher, an analytic engine, and a global validator. In some examples, the configuration manager is a component that configures which modules are part of the federation, and where each graph database is located. In some examples, the entity matcher is a component that specifies concepts matching across all modules (for example, all entities with label $X_1$ in database $Y_1$ are identical to entities with label $X_2$ in database $Y_2$ according to a function $f(x_1 \rightarrow x_2)$). In some examples, the analytical engine is a component that realizes advanced analytics on top of the data federation. Example analytics can include, without limitation, data federation graph queries (queries that traverse the knowledge graphs across the shards), cross-shards graph algorithms, graph theory algorithms (e.g., shortest path, centrality measures), information completion of missing entities and relations, and entity similarity. In some examples, the global validator is a component that verifies that all graph databases hold the required entities and relations to run a valid execution of analytics.

In general, each module in the set of modules is independent, and includes a graph database, an ontology, a validator, a version control, and a graph creation pipeline. In some examples, the graph database is a dedicated graph database holds a knowledge graph provided for the respective module. In some examples, the ontology is provided as a web ontology language (OWL) model of the knowledge graph. In some examples, the validator is a component that validates the knowledge graph with regard to the ontology. In some examples, the version control is a component that manages versions of the knowledge graph. In some examples, the graph creation pipeline is a pipeline that transforms the source data (e.g., information from repositories) into a valid knowledge graph for the respective module. Table 1, below, provides an example mapping of each module to a respective cyber-security repository (data source).

TABLE 1

Example Mapping of Modules to Data Sources

| KG module | Description | Data source |
|---|---|---|
| Vulnerabilities[1] and products[2] | *CVE: This repository enumerates the known security vulnerabilities by CVE (Common Vulnerabilities and Exposures) id and entry. For each CVE the entry contains the following data: textual description, severity score (CVSS), references and CPE (NVD) and CWE (MITRE) relations.<br>*CPE: Except of the vulnerabilities, NVD also holds CPE (Common Platform Enumeration) which is a structured naming scheme that standards the platform (vendor, name, version, etc.) to one format. CPE also includes a method for checking names against a system, and a description format for binding text and tests to a name.<br>*CVE represents a specific vulnerability in a specific platform(s). There is a relation between CVE to each relevant CPE, but not all the relations exist. | NVD: National Vulnerability Database (NVD) |
| Weaknesses[3] | CWE: Common Weakness Enumeration is a list of software and hardware weakness types. CWE assign relations between the different existing CWE entries, for example 'parentOf', 'peerOf', etc. In addition, each CWE entry contains its own textual description, CWE group membership, examples of related CVEs, and related attack pattern, CAPEC. | MITRE |
| Attack patterns[4] | CAPEC: provides a comprehensive dictionary of known patterns of attack employed by adversaries to exploit known weaknesses in cyber-enabled capabilities. | |

TABLE 1-continued

Example Mapping of Modules to Data Sources

| KG module | Description | Data source |
| --- | --- | --- |
| ATT&CK[5] framework | ATT&CK: a globally-accessible knowledge base of adversary tactics and techniques based on real-world observations. The ATT&CK knowledge base is used as a foundation for the development of specific threat models and methodologies in the private sector, in government, and in the cyber-security product and service community. | |
| D3FEND[6] framework | D3FEND: a knowledge graph of countermeasures which associated with digital artifacts and attack techniques | |
| Cloud vendors | Information regards cloud resources and services mined from API specifications | OntoDis |
| Threat intelligence | Information regards exploitations of vulnerabilities associated with attacker groups, campaigns, targeted industries, and more. | IntelGraph |

[1]https://nvd.nist.gov/vuln
[2]https://nvd.nist.gov/products/cpe/search
[3]https://cwe.mitre.org/
[4]https://capec.mitre.org/
[5]https://attack.mitre.org/

As introduced above, implementations of the present disclosure provide for self-evolvement of the knowledge mesh, which reflected by a reasoning engine that learns historical data and able to complete missing links and entities. With regard to missing links, non-limiting examples can include: association between vulnerabilities and weaknesses (CVE to CWE), association between weaknesses and attack patterns (CWE to CAPEC), and association between attack patterns to attack techniques (CAPEC to ATT&CK). The task of adding missing entities to SMESH includes adding new objects to a knowledge graph and inferring its links. For example, adding missing attack techniques (as MITRE ICS or ATLAS) and infer associations with countermeasures and digital artifacts. Further, implementations of the present disclosure provide multiple directions to apply information completion. Non-limiting examples include natural language processing (NLP) techniques to associate object descriptions, topological link prediction (e.g., https://neo4j.com/docs/graph-data-science/current/algorithms/linkprediction/) and node embedding (https://arxiv.org/abs/2002.00819) approaches, and logical inference, for example, using SWRL (https://www.w3.org/Submission/SWRL/).

Due to the decentralized nature of CVE reporting and generation, there are often incomplete, incorrect, or overly broad fields in the descriptive fields for the CVE. Misaligned fields can affect the quickness and quality of responses to newly released or detected vulnerabilities, in the case of incomplete or incorrect fields, breaking automation processes built around them. In the case of incorrect or overly broad CWE fields, the quality of response and remediation to the CVE can be affected.

An example can be provided in the context of vulnerability remediation. A team at an organization may be responsible for remediating vulnerabilities found based on vulnerability reporting. When a vulnerability is report generated, the team attempts to enrich the CVE information with CWE information to provide context related to the steps needed to remediate the vulnerability. The CWE information for a CVE in public datasets may be missing. Additionally or alternatively, the CWE information that is present may be overly broad. For example, a CWE can be assigned that describes a broader class of weaknesses as opposed to a more specific and precise CWE. Both of these use cases affect the quality of the response, decreasing either the quickness (by breaking the enrichment automation processes and/or forcing the remediation analyst to research the vulnerability more in depth) or decreasing the quality (presenting poor or incorrect information about the vulnerability that once again forces the remediation analyst to do more research). The techniques can be used to provide a CWE based on a textual vulnerability description.

A vulnerability can be a weakness in the computational logic (e.g., code) found in software and hardware components that, when exploited, results in a negative impact to confidentiality, integrity, or availability. Mitigation of the vulnerabilities in this context typically involves coding changes, but could also include specification changes or even specification deprecations (e.g., removal of affected protocols or functionality in their entirety). The purpose of CVE is to uniquely identify vulnerabilities and to associate specific versions of code bases (e.g., software and shared libraries) to those vulnerabilities. The use of CVEs ensures that two or more parties can confidently refer to a CVE identifier (ID) when discussing or sharing information about a unique vulnerability. CWE is a community-developed list of software and hardware weakness types. It serves as a common language, a measuring stick for security tools, and as a baseline for weakness identification, mitigation, and prevention effort.

Figure 5:
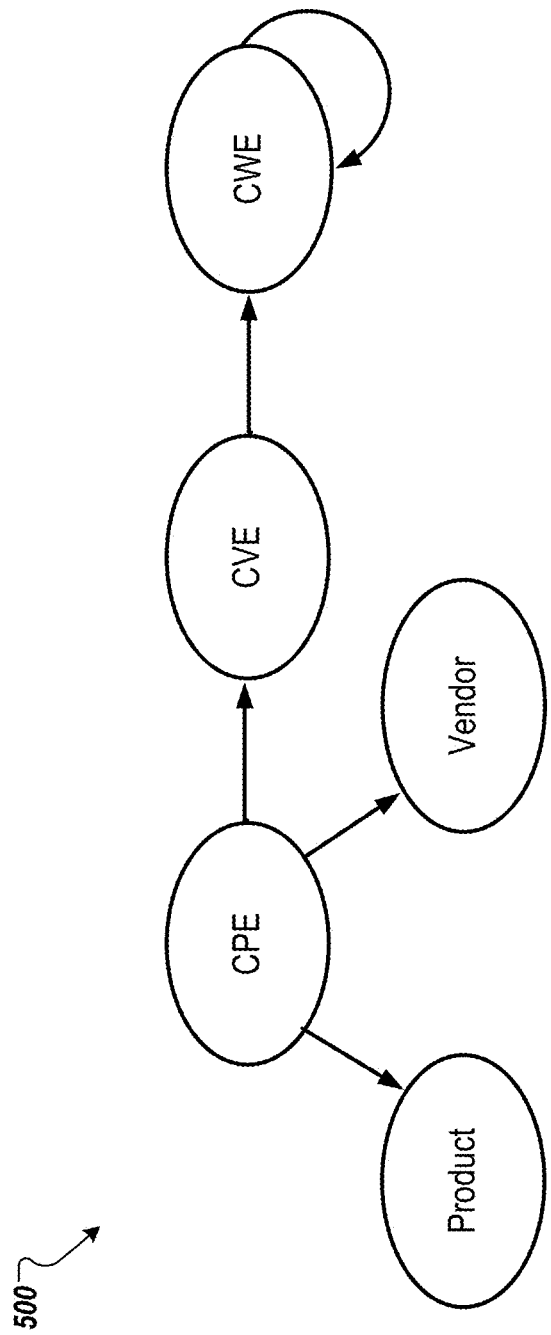
FIG. 5 depicts an example knowledge mesh sub-graph used for exploitation prediction training in accordance with implementations of the present disclosure.

FIG. 5 depicts an example knowledge mesh sub-graph 500 used for exploitation prediction training in accordance with implementations of the present disclosure. The exploitation prediction training process is performed using the "Vulnerabilities and Products" and "Weakness" knowledge graph modules of the SMESH, including the CPE, CVE, and CWE data.

The Vulnerabilities and Products module includes CVEs and CPEs. The CVE repository enumerates the known security vulnerabilities by CVE ID and entry. For each CVE the entry can contain a textual description, severity scores (CVSS), attack vector strings, references, and CPE and CWE relations. CVE entries can include one or more time stamps. The time stamps can indicate the created time, the published time, or both. The CPE repository includes a structured naming scheme that converts platform information (e.g., vendor, product, version) to a common format.

CPE includes a method for checking names against a system, and a description format for binding text and tests to a name.

The Weaknesses module includes CWEs. The CWE repository includes a list of software and hardware weakness types. The CWE repository includes relations between different CWE entries, for example 'parentOf', 'peerOf.' Each CWE entry contains a textual description, CWE group membership, examples of related CVEs, and related attack patterns.

Figure 6:
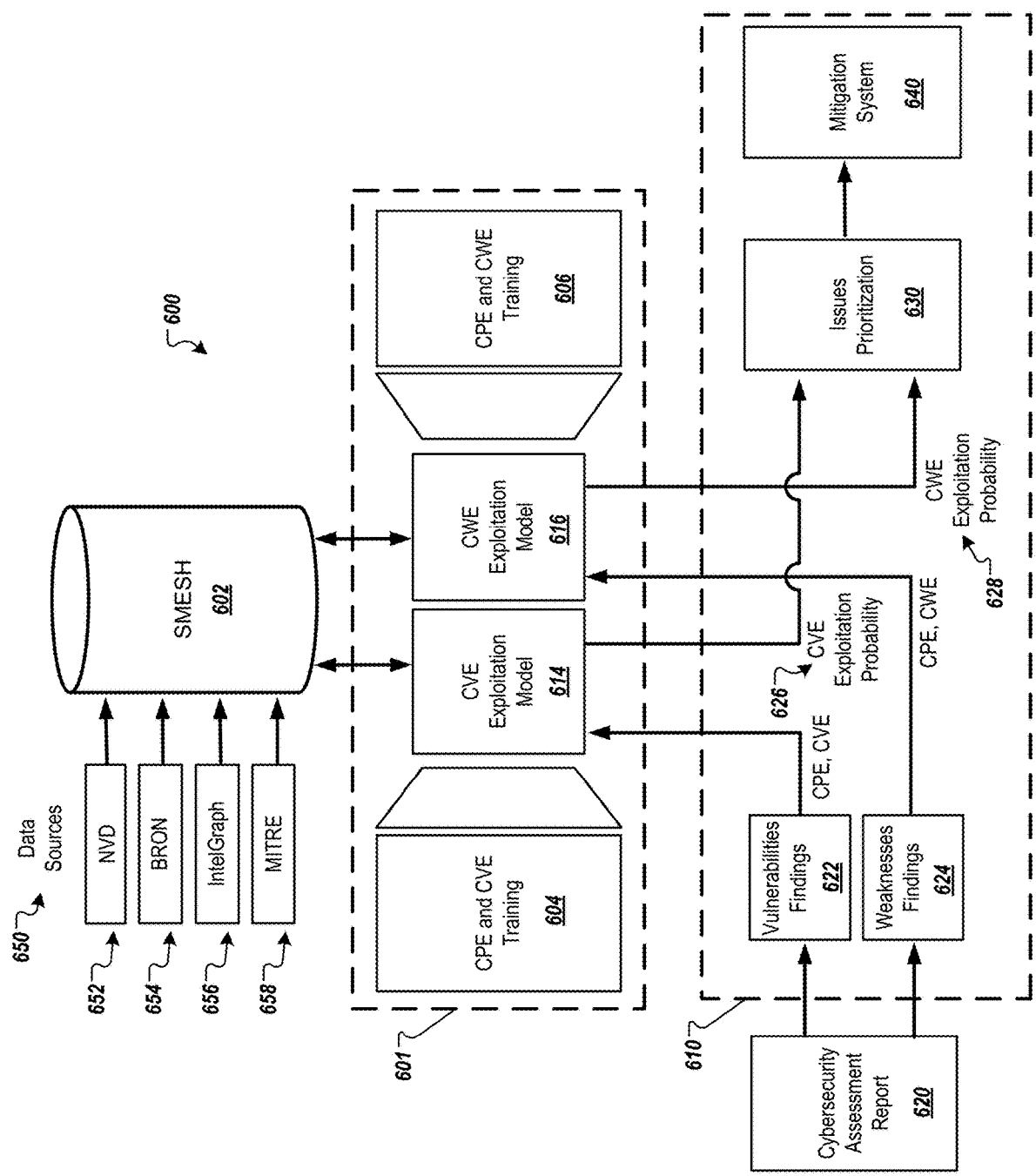
FIG. 6 depicts an example system for predicting exploitation of cybersecurity issues in accordance with implementations of the present disclosure.

FIG. 6 depicts an example system 600 for predicting exploitation of cybersecurity issues in accordance with implementations of the present disclosure. Exploitation prediction training can be performed using an SMESH 602. As described above, the SMESH 602 is a knowledge mesh, with an underlying data federation architecture, and a set of methods that enable self-evolvement. The SMESH is generated using data from multiple data sources 650. As described with reference to Table 1, the data sources 650 include NVD 652, BRON 654, IntelGraph 656, and MITRE 658.

The system 600 includes a training system 601. The training system 601 trains a CVE exploitation model 614 and a CWE exploitation model 616 using the SMESH 602. The CVE exploitation model 614 is trained by a CPE and CVE training process 604. The CWE exploitation model 616 is trained by a CPE and CWE training process 606.

The CPE and CVE training process 604 includes generating training data sets including training samples. Generating a training data set includes extracting and parsing CVE records from the SMESH 602. The CVE records can be sourced from the Intelgraph 656 platform. The CPE and CVE training process 604 includes processing and analyzing vulnerabilities features of the CVE records. The training process includes consolidating SMESH data from multiple vulnerability sources (e.g., cybersecurity and infrastructure security agency (CISA), Exploit-DB to identify whether existing vulnerabilities have been historically exploited.

The SMESH 602 can include historical data representing past exploitations of vulnerabilities. The historical data can indicate, for a particular vulnerability, whether the vulnerability has historically been exploited. The historical data can represent events that occurred several months in the past or earlier. For example, the historical data can represent events that occurred fourth months in the past or earlier, six months in the past or earlier, or eight months in the past or earlier. The time of an exploitation can be determined based on time stamps of the associated CVE entries.

In some examples, a training set includes many (e.g., millions of) entries of training samples. Each training sample can include a <CVE, CPE> pair and a label indicating whether or not the <CVE, CPE> pair was exploited. A <CVE, CPE> pair is exploited when a vulnerability represented by the CVE is exploited on a platform represented by the CPE.

Each training sample can include, for the CVE, identifying information such as CVE name and created time. Each training sample can include numerical features such as CVSS severity scores. Each training sample can include CVSS vector strings and features. Each training sample can include a CVE-related CWE. Each training sample can include, for the CPE, the affected software name, product, vendor, and part features. In some examples, a training sample can include fifteen CVE features (e.g., four numerical features and eleven categorical features), three categorical CPE features, and one Boolean label (i.e., whether the CVE has been exploited).

Prior to training the CVE exploitation model 614, the training system 601 preprocesses the training set in order to improve the trained model's accuracy and robustness. Preprocessing includes cleaning the training data samples (e.g., by dropping duplicates and invalid samples). Preprocessing includes applying the one-hot encoding method to convert categorical variables into numerical data.

In some examples, the training data samples have imbalanced labels, since in general only a small percentage of vulnerabilities (e.g., approximately six percent) have been exploited. Therefore, preprocessing includes applying an oversampling method (e.g., the SMOTE method) to generate synthetic samples for the minority class. In some examples, preprocessing includes applying a normalization technique to scale each input variable separately. The input can be scaled to a range depending on the scalar technique applied. The range can be, for example, from zero to one or from zero to one hundred.

The CPE and CVE training process 604 can include training a set of machine learning models trained to determine probabilities of exploitation of vulnerabilities. The set of machine learning models can include, for example, six different predictive machine learning models. The models can include logistic regression, decision tree, random forest, Extreme Gradient (XG) boosting, ridge regression, support vector machine (SVM), natural language processing (NLP)-based model, or any other appropriate type of machine learning model.

The training system 601 creates and trains the set of machine learning models using the training data set. Each machine learning model of the set of machine learning models can then be tested on the testing data set. In some examples, the testing data set includes training samples from the training data set, with the exploitation removed. In some examples, the testing data set includes test samples generated from historical data. The historical data used to generate the testing data set can be more recent than the historical data used to generate the training data set. For example, the historical data used to generate the training data set can be six months old and older, and the historical data used to generate the testing data set can be less than six months old.

The CPE and CVE training process 604 includes evaluating the performance of each machine learning model of the set of machine learning models. The performance of a machine learning model can be evaluated when the machine learning model is running on the training data set, on the testing data set, or both. The performance of a machine learning model can be evaluated using various metrics.

A first metric is training/testing accuracy. The training/testing accuracy is a ratio of correct predictions over the total number of samples from the training data set, the testing data set, or both.

A second metric is a false positive rate. The false positive rate is a ratio of non-exploited vulnerabilities wrongly predicted as exploited vulnerabilities. A lower false positive rate is better than a higher false positive rate.

A third metric is a false negative rate. The false negative rate is a ratio of exploited vulnerabilities wrongly predicted as non-exploited vulnerabilities. A lower false negative rate is better than a higher false negative rate.

A fourth metric is runtime. Runtime is a total time that the machine learning model takes to finish running on the training data set or the testing data set. A lower runtime is better than a higher runtime.

The CPE and CVE training process 604 includes comparing the performances of the machine learning models and selecting a machine learning model based on the comparison. For example, the set of machine learning models can include a logistic regression model, a decision tree model, and a random forest model. The training system 601 can determine, using the performance metrics, that the decision tree model has the best performance of the set of machine learning models. Based on determining that the decision tree model has the best performance of the set of machine learning models, the training system 601 can select the decision tree model for use in predicting exploitation of vulnerabilities in networks.

In some examples, before or after testing the performance of the set of machine learning models, and before or after selecting a particular machine learning model, the training system 601 can tune the model or models. For example, a machine learning model can have hyperparameters that are tunable. The training system 601 can tune and retrain the machine learning model using training data samples to improve the performance of the machine learning model.

The CPE and CWE training process 606 is similar to the CPE and CVE training process 604. The CPE and CWE training process 606 includes generating training data sets including training samples. The training samples for the CPE and CWE training process 606 can include vulnerability features that include the vulnerable product, the vendor, and the specific CWE (Common Weakness Enumeration) to which the vulnerability relates. The training system 601 uses the vulnerability features to train the CWE exploitation model 616 to model output the probability that the vulnerability will be utilized.

The CPE and CWE training process 606 trains a CWE exploitation model 616 using a dataset containing many (e.g., millions of) vulnerabilities. A percentage of the vulnerabilities were historically exploited.

The CPE and CWE training process 606 includes the following steps. In some examples, the training system 601 performs CWE clustering as part of the CPE and CWE training process 606. CWE clustering is performed using SMESH 602 based on the relationship between CWEs. For example, a first CWE can be a parent or child of another CWE. Clustering includes obtaining CWEs from the SMESH 602, as well as the associated interrelations. Clustering can include performing a community detection method to detect CWE communities, such as the Louvain method for community detection. The training system 601 can generate training samples for the CWE exploitation model 616 including clusters, or communities, of related CWEs.

The CPE and CWE training process 606 includes CPE data balancing. The dataset is likely to be unbalanced, with only a small percentage of the vulnerabilities having been historically exploited. CPE data balancing includes under sampling the non-exploited group to be approximately the same size as the vulnerable group.

The CPE and CWE training process 606 includes data pre-processing. Pre-processing includes converting raw data into a machine learning model input format. When in the machine learning model input format, a CWE is represented by a numerical ID, and a CPE product and vendor are presented as one-hot-vector.

The CPE and CWE training process 606 includes training the CWE exploitation model 616. In some examples, the CWE exploitation model 616 is a random forest classifier model.

In some examples, the CPE and CWE training process 606 includes training multiple machine learning models, evaluating the performance of the multiple machine learning models, and selecting one of the machine learning models based on the performance, as described above with reference to the CVE exploitation model 614.

The trained CVE exploitation model 614 and the trained CWE exploitation model 616 are saved for use in predicting exploitation of cybersecurity issues in networks. A security platform 610 can trigger the CVE exploitation model 614, the CWE exploitation model 616, or both, based on discovering cybersecurity flaws in a network or system.

A security platform 610 obtains a cybersecurity assessment report 620. The cybersecurity assessment report 620 includes data representing observed conditions in an enterprise network. Each observed condition is associated with at least one cybersecurity issue. A cybersecurity issue can be a vulnerability comprising an instance of a vulnerable condition (e.g., a vulnerabilities finding). A cybersecurity issue can be a weakness that is likely to cause a vulnerability to occur (e.g., a weaknesses finding).

A vulnerabilities finding is a finding of an issue in a specific platform that can be exploited by an attacker to deliver a successful attack. They can occur through flaws, features or user error, and attackers will look to exploit any of them, often combining one or more, to achieve their end goal. Example vulnerabilities findings in a product or platform include: server certificates not being verified, authentication bypass being possible, plugin for space requesting excessive permissions, and a token with limited permissions being able to gain full account access.

A weaknesses finding is a finding of a condition in a software, firmware, hardware, or service component that, under certain circumstances, could contribute to the introduction of vulnerabilities. Example weaknesses findings include: cross-site scripting (XSS), integer signedness errors, buffer over-read, heap-based buffer overflow, incomplete denylist, improper input validation, and insufficient precision of a real number.

The security platform 610 extracts, from the cybersecurity assessment report 620, vulnerabilities findings 622, weaknesses findings 624, or both. When the security platform extracts vulnerabilities findings 622, the security platform provides the vulnerabilities findings 622 to the CVE exploitation model 614 in order to obtain the probability that the vulnerabilities findings 622 will be utilized. In some examples, a vulnerabilities finding 622 includes a CVE and one or more associated CPEs. Each CPE can include the affected software name, product, vendor, and part features. When the security platform extracts weaknesses findings 624, the security platform provides the weaknesses findings 624 to the CWE exploitation model 616 in order to obtain the probability that the weaknesses findings 624 will be utilized. In some examples, a weaknesses finding 624 includes a CWE and one or more associated CPEs.

The CVE exploitation model 614 and the CWE exploitation model 616 determine probabilities of exploitation of the cybersecurity issues associated with the observed conditions from the cybersecurity assessment report 620. The CVE exploitation model 614 outputs a CVE exploitation probability 626 to the security platform 610. The CWE exploitation model 616 outputs a CWE exploitation probability 628 to the security platform 610.

Each model produces a floating point outcome representing a probability of exploitation. For example, the CVE exploitation model 614 can output, for a particular CVE, a CVE exploitation probability 626 including values of <0.7, 0.3>. The first value 0.7 represents a seventy percent likelihood of the particular CVE being exploited. The second value 0.3 represents a thirty percent likelihood of the particular CVE not being exploited.

The CVE exploitation probability 626 and the CWE exploitation probability 628 can be used to perform issues prioritization 630. The security platform 610 can perform issues prioritization 630 by assigning a priority ranking to each of the observed conditions in the enterprise network based on the respective probabilities of exploitation for the cybersecurity issues associated with the observed conditions. After performing issues prioritization 630, a prioritized list of conditions can be provided to a mitigation system. In some examples, a prioritized list can include both CVEs and CWEs. In some examples, a prioritized list can include only CVEs. or only CWEs. For example, a first prioritized list can include CVEs, and a second prioritized list can include CWEs.

A particular condition indicated in the cybersecurity assessment report 620 can be associated with a CVE, a CWE, or both. The CVE exploitation probability 626 and the CWE exploitation probability 628 for the same condition can be the same as each other, or can be different from each other. When the CVE exploitation probability 626 and the CWE exploitation probability 628 for the same condition are different from each other, the security platform can perform issues prioritization 630 based on the CVE exploitation probability 626, based on the CWE exploitation probability 628, or based on a combination of both the CVE exploitation probability 626 and the CWE exploitation probability 628.

The mitigation system 640 can perform actions to mitigate the observed conditions in the enterprise network based on the respective priority rankings. For example, the mitigation system 640 can select to perform a first action to mitigate a first condition that has a higher priority before performing a second action to mitigate a second condition that has a lower priority.

Figure 7:
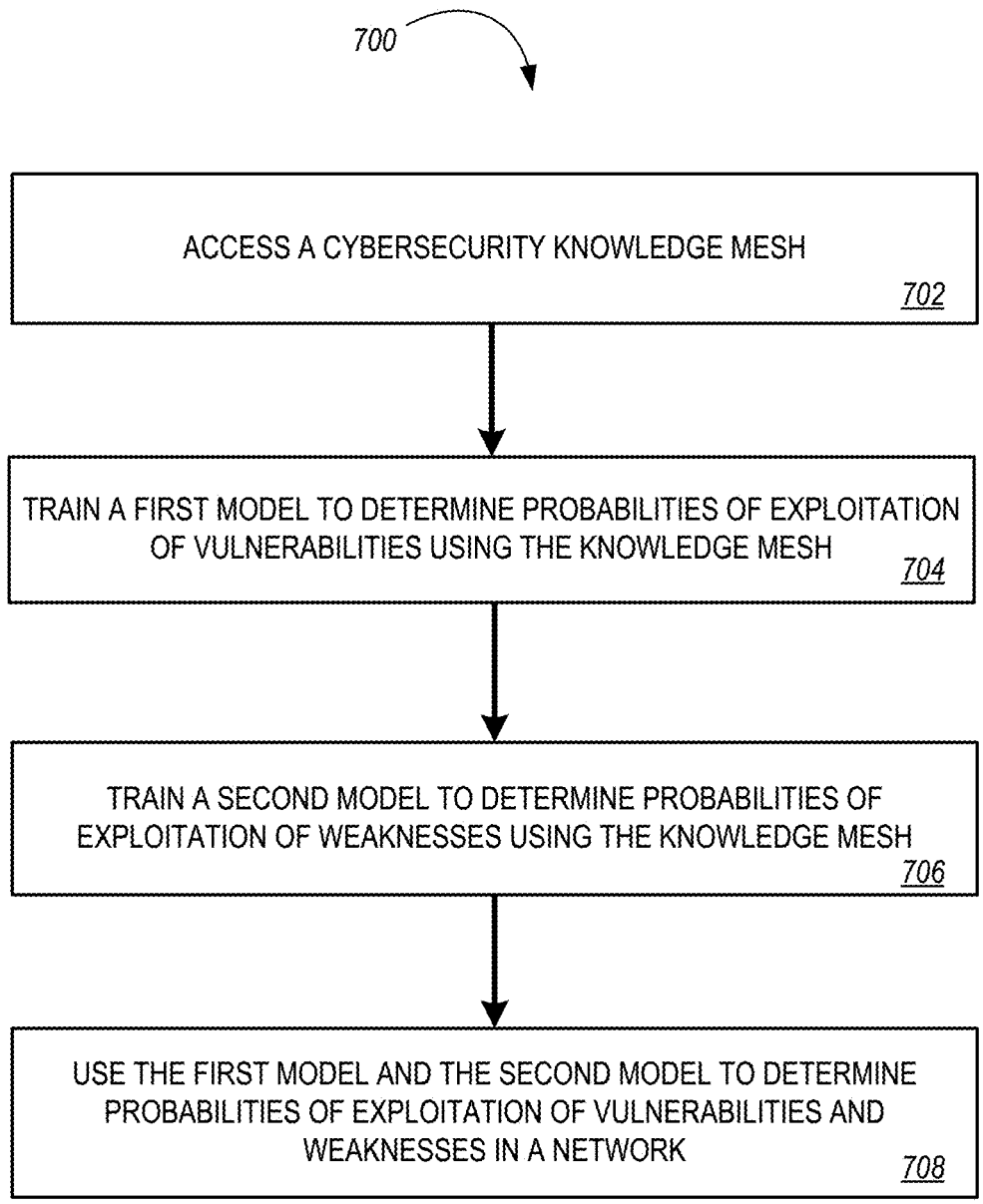
FIG. 7 depicts an example flow diagram of a process for developing exploitation prediction models.

FIG. 7 depicts an example flow diagram of a process 700 for developing exploitation prediction models.

The process 700 includes accessing a cybersecurity knowledge mesh (702). The knowledge mesh can be, for example, the SMESH 602 as shown in FIG. 6.

The process 700 includes training a first model to determine probabilities of exploitation of vulnerabilities using the knowledge mesh (704). For example, referring to FIG. 6, the CPE and CVE training process 604 is used to train the CVE exploitation model 614 with data from the SMESH 602.

The process 700 includes training a second model to determine probabilities of exploitation of weaknesses using the knowledge mesh (706). For example, referring to FIG. 6, the CPE and CWE training process 606 is used to train the CWE exploitation model 616 with data from the SMESH 602.

The process 700 includes using the first model and the second model to determine probabilities of exploitation of vulnerabilities and weaknesses in a network (708). For example, referring to FIG. 6, the CVE exploitation model 614 determines CVE exploitation probabilities 626 of vulnerabilities findings 622. The CVE exploitation model 614 receives, as input, the vulnerabilities findings 622. The CVE exploitation model 614 provides, as output, the CVE exploitation probabilities 626 for the vulnerabilities findings 622.

The CWE exploitation model 616 determines CWE exploitation probabilities 628 of weaknesses findings 624. The CWE exploitation model 616 receives, as input, the weaknesses findings 624. The CWE exploitation model 616 provides, as output, the CWE exploitation probabilities 628 for the weaknesses findings 624.

The security platform 610 uses the CVE exploitation probabilities 626 and the CWE exploitation probabilities 628 to perform issues prioritization 630.

Figure 8:
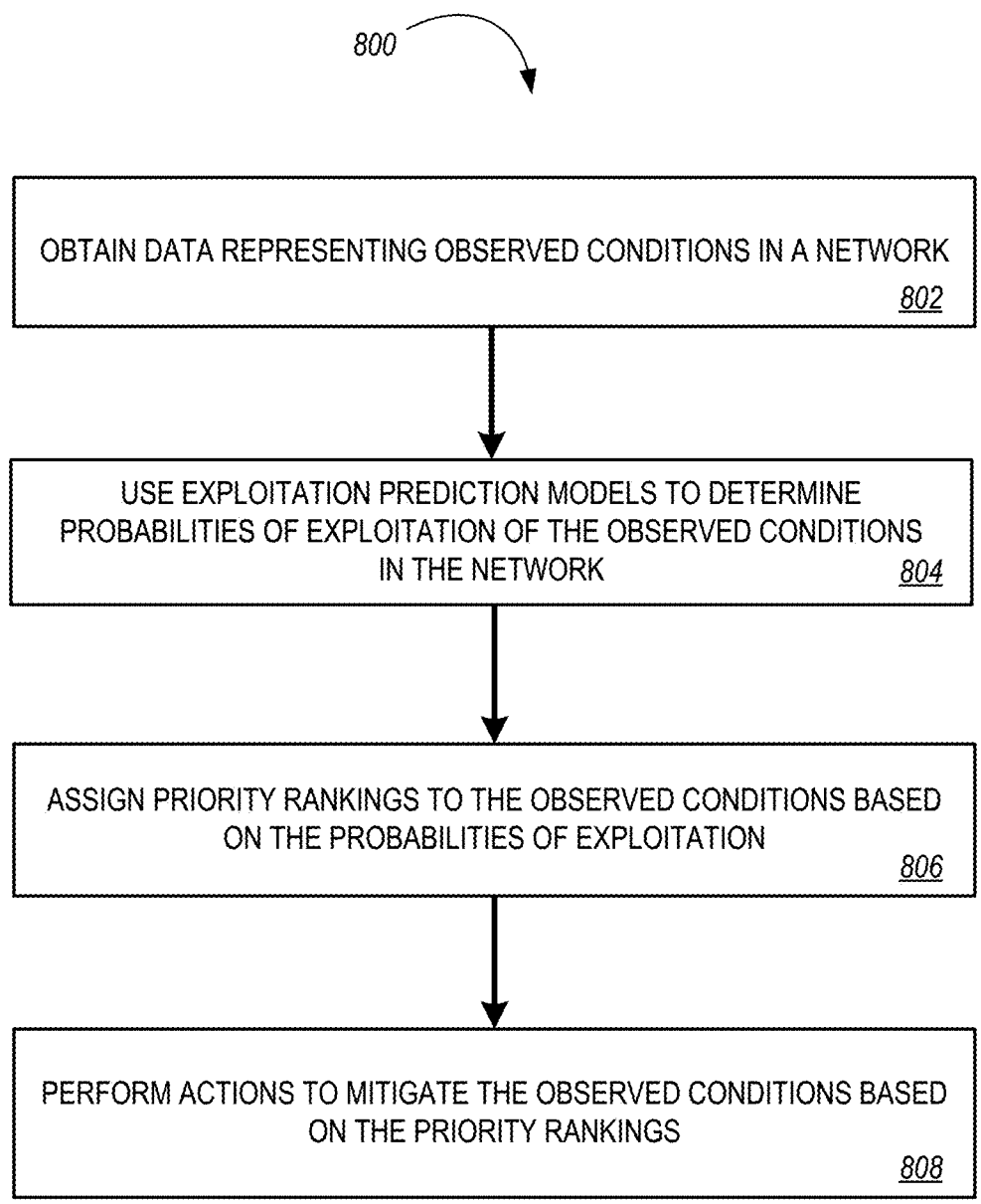
FIG. 8 depicts an example flow diagram of a process for using exploitation prediction models to mitigate cybersecurity risk.

FIG. 8 depicts an example flow diagram of a process 800 for using exploitation prediction models to mitigate cybersecurity risk.

The process 800 includes obtaining data representing observed conditions in a network (802). For example, referring to FIG. 6, a security platform 610 receives the cybersecurity assessment report 620 that indicates observed conditions in a network. An observed condition can be, for example, a flaw in the network. The observed condition can be associated with cybersecurity weaknesses, cybersecurity vulnerabilities, or both.

The process 800 includes using exploitation prediction models to determine probabilities of exploitation of the observed conditions in the network (804). For example, referring to FIG. 6, the CVE exploitation model 614 and the CWE exploitation model 616 determine probabilities of exploitation of the vulnerabilities findings 622 and the weaknesses findings 624 from the cybersecurity assessment report 620.

The process 800 includes assigning priority ranking to the observed conditions based on the probabilities of exploitation (806). For example, referring to FIG. 6, the security platform 610 performs issues prioritization 630 based on the CVE exploitation probabilities 626 of the vulnerabilities findings 622 and based on the CWE exploitation probabilities 628 of the weaknesses findings 624. In some examples, the security platform 610 can assign a higher priority to a vulnerabilities finding with a higher exploitation probability, and a lower priority to a vulnerabilities finding with a lower exploitation probability. In some examples, the security platform 610 can assign a higher priority to a weaknesses finding with a higher exploitation probability, and a lower priority to a weaknesses finding with a lower exploitation probability.

The process 800 includes performing actions to mitigate the observed conditions based on the priority rankings (808). For example, referring to FIG. 6, the security platform 610 includes a mitigation system 640. The mitigation system 640 performs actions to mitigate the observed conditions, for example, by fixing flaws in the network. The mitigation system 640 can prioritize the observed conditions based on the prioritization of the respective associated cybersecurity issues. For example, the mitigation system 640 can perform actions to fix a higher priority finding prior to performing actions to fix a lower priority finding. In some examples, the mitigation system 640 performs automatic remediation actions based on the priority rankings. Automatic remediation actions can include, for example, updating software, enabling bucket encryption, blocking bucket public access, removing security group global access, hardening permissive access on insecure security group rules, and blocking specific ports. In some examples, the mitigation system 640 is a security platform that sends remediation instructions to a queuing service, triggering a function that calls the appropriate action to remediate the weakness or vulnerability.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for reducing cybersecurity risk in enterprise networks, comprising:
obtaining data representing observed conditions in an enterprise network, each observed condition being associated with at least one cybersecurity issue, wherein a cybersecurity issue comprises one of (i) a vulnerability comprising an instance of a vulnerable condition or (ii) a weakness that is likely to cause a vulnerability to occur;
using a plurality of exploitation prediction models to determine probabilities of exploitation of the cybersecurity issues associated with the observed conditions in the enterprise network, wherein the plurality of exploitation prediction models are trained using a knowledge mesh generated using data from one or more cybersecurity repositories;
assigning a priority ranking to each of the observed conditions in the enterprise network based on the respective probabilities of exploitation for the cybersecurity issues associated with the observed conditions; and
performing one or more actions to mitigate the observed conditions in the enterprise network based on the respective priority rankings,
wherein the observed conditions include a first condition that is associated with a first vulnerability and is associated with a first weakness, further comprising:
obtaining output from a first model indicating a first probability of exploitation for the first vulnerability;
obtaining output from a second model indicating a second probability of exploitation for the first weakness; and
assigning a priority ranking to the first condition based on at least one of the first probability of exploitation for the first vulnerability and the second probability of exploitation for the first weakness.

2. The method of claim 1, further comprising training, using the knowledge mesh, the plurality of exploitation prediction models to determine probabilities of exploitation of cybersecurity issues,
wherein the knowledge mesh includes a plurality of modules, each module maintaining a knowledge graph generated using data from the one or more cybersecurity repositories.

3. The method of claim 2, wherein training, using the knowledge mesh, the plurality of exploitation prediction models to determine probabilities of exploitation of cybersecurity issues comprises:
training the first model to determine probabilities of exploitation of vulnerabilities; and
training the second model to determine probabilities of exploitation of weaknesses.

4. The method of claim 3, wherein using the plurality of exploitation prediction models to determine probabilities of exploitation of the observed conditions comprises:
extracting, from the obtained data, vulnerabilities associated with the observed conditions,
providing, as input to the first model, the vulnerabilities,
obtaining, as output from the first model, respective probabilities of exploitation for each of the vulnerabilities.

5. The method of claim 3, wherein using the plurality of exploitation prediction models to determine probabilities of exploitation of the observed conditions comprises:
extracting, from the obtained data, weaknesses associated with the observed conditions,
providing, as input to the second model, the weaknesses, and
obtaining, as output from the second model, respective probabilities of exploitation for each of the weaknesses.

6. The method of claim 3, wherein the first model comprises a first machine learning model of a first set of machine learning models trained to determine probabilities of exploitation of vulnerabilities.

7. The method of claim 6, further comprising:
training the first set of machine learning models to determine probabilities of exploitation of vulnerabilities;
evaluating each of the first set of machine learning models including determining, for each of the plurality of exploitation prediction models, an accuracy, a false positive rate, and a false negative rate; and
selecting the first model from the first set of machine learning models based on evaluating each of the first set of machine learning models.

8. The method of claim 3, wherein the second model comprises a second machine learning model of a second set of machine learning models trained to determine probabilities of exploitation of vulnerabilities.

9. The method of claim 8, further comprising:
training the second set of machine learning models to determine probabilities of exploitation of vulnerabilities;
evaluating each of the second set of machine learning models including determining, for each of the plurality of exploitation prediction models, an accuracy, a false positive rate, and a false negative rate; and
selecting the second model from the second set of machine learning models based on evaluating each of the second set of machine learning models.

10. The method of claim 1, wherein the knowledge mesh includes historical data indicating, for each of multiple cybersecurity issues, whether the cybersecurity issue has been exploited.

11. The method of claim 10, wherein training, using the knowledge mesh, an exploitation prediction model of the plurality of exploitation prediction models to determine probabilities of exploitation of cybersecurity issues comprises:
providing, as input to the exploitation prediction model, training samples generated from the knowledge mesh, a training sample comprising:
information identifying the cybersecurity issue, and
a label indicating whether the cybersecurity issue has been exploited.

12. The method of claim 1, wherein the data indicating vulnerabilities includes, for each vulnerability, a textual description and a severity score.

13. The method of claim 1, wherein a probability of exploitation of a cybersecurity issue comprises:
a likelihood that the exploitation of the cybersecurity issue will occur; and
a likelihood that the exploitation of the cybersecurity issue will not occur.

14. The method of claim 1, wherein the first probability of exploitation for the first vulnerability is different than the second probability of exploitation for the first weakness.

15. The method of claim 14, further comprising:
assigning the priority ranking to the first condition based on a combination of the first probability of exploitation and the second probability of exploitation.

16. The method of claim 14, further comprising:
assigning the priority ranking to the first condition based on the first probability of exploitation or the second probability of exploitation.

17. A system comprising:
one or more computers; and
one or more storage devices storing instructions that are operable, when executed by the one or more computers, to cause the one or more computers to perform operations comprising:
  obtaining data representing observed conditions in an enterprise network, each observed condition being associated with at least one cybersecurity issue, wherein a cybersecurity issue comprises one of (i) a vulnerability comprising an instance of a vulnerable condition or (ii) a weakness that is likely to cause a vulnerability to occur;
  using a plurality of exploitation prediction models to determine probabilities of exploitation of the cybersecurity issues associated with the observed conditions in the enterprise network, wherein the plurality of exploitation prediction models are trained using a knowledge mesh generated using data from one or more cybersecurity repositories;
  assigning a priority ranking to each of the observed conditions in the enterprise network based on the respective probabilities of exploitation for the cybersecurity issues associated with the observed conditions; and
performing one or more actions to mitigate the observed conditions in the enterprise network based on the respective priority rankings,
wherein the observed conditions include a first condition that is associated with a first vulnerability and is associated with a first weakness, further comprising:
  obtaining output from a first model indicating a first probability of exploitation for the first vulnerability;
  obtaining output from a second model indicating a second probability of exploitation for the first weakness; and
  assigning a priority ranking to the first condition based on at least one of the first probability of exploitation for the first vulnerability and the second probability of exploitation for the first weakness.

18. A non-transitory computer-readable medium storing software comprising instructions executable by one or more computers which, upon such execution, cause the one or more computers to perform operations comprising:
  obtaining data representing observed conditions in an enterprise network, each observed condition being associated with at least one cybersecurity issue, wherein a cybersecurity issue comprises one of (i) a vulnerability comprising an instance of a vulnerable condition or (ii) a weakness that is likely to cause a vulnerability to occur;
  using a plurality of exploitation prediction models to determine probabilities of exploitation of the cybersecurity issues associated with the observed conditions in the enterprise network, wherein the plurality of exploitation prediction models are trained using a knowledge mesh generated using data from one or more cybersecurity repositories;
  assigning a priority ranking to each of the observed conditions in the enterprise network based on the respective probabilities of exploitation for the cybersecurity issues associated with the observed conditions; and
performing one or more actions to mitigate the observed conditions in the enterprise network based on the respective priority rankings,
wherein the observed conditions include a first condition that is associated with a first vulnerability and is associated with a first weakness, further comprising:
  obtaining output from a first model indicating a first probability of exploitation for the first vulnerability;
  obtaining output from a second model indicating a second probability of exploitation for the first weakness; and
  assigning a priority ranking to the first condition based on at least one of the first probability of exploitation for the first vulnerability and the second probability of exploitation for the first weakness.

* * * * *